United States Patent [19]
Randell

[11] Patent Number: 5,826,020
[45] Date of Patent: Oct. 20, 1998

[54] WORKFLOW REAL TIME INTERVENTION

[75] Inventor: Jim Randell, Clifton, United Kingdom

[73] Assignee: Hewlett-Packard Co., Palo Alto, Calif.

[21] Appl. No.: 715,886

[22] Filed: Sep. 18, 1996

Related U.S. Application Data

[63] Continuation of Ser. No. 315,469, Sep. 30, 1994, abandoned.
[51] Int. Cl.$^6$ ........................................ G06F 13/00
[52] U.S. Cl. .......................... 395/200.32; 395/200.56; 395/200.68; 395/200.31
[58] Field of Search ................................ 395/670, 672, 395/676, 200.31, 200.32, 200.03, 200.34, 200.56, 200.68, 200.57, 684, 185.04, 849

[56] References Cited

U.S. PATENT DOCUMENTS

| | | | |
|---|---|---|---|
| 4,631,673 | 12/1986 | Haas | 707/100 |
| 4,763,356 | 8/1988 | Day, Jr. | 379/368 |
| 5,333,314 | 7/1994 | Masai | 707/202 |
| 5,357,630 | 10/1994 | Oprescu | 707/10 |
| 5,408,608 | 4/1995 | Ryu | 707/10 |
| 5,414,847 | 5/1995 | Tsukakoshi | 705/1 |
| 5,475,833 | 12/1995 | Dauerer | 707/201 |

*Primary Examiner*—Majid A. Banankham

[57] ABSTRACT

A workflow system that automates the definition and execution of a procedure that can be carried out according to defined rules among agents. Agents may be individual users, work groups, organizations, or automatic systems. Automation is used to guarantee that all the individual activities are taken in the defined sequence, form, and time. The system separates the three basic elements necessary to perform a procedure—a co-ordination service, an organization service, and a transport service. The co-ordination service ensures proper sequence of the activities of the procedure. The organization services identifies a particular agent to perform a task within a procedure. The agent selection can be made when the procedure is defined, or it can be deferred until an instance using the procedure is performed. The transport service is used to move information between agents and an information service, which holds instance data, while processing an instance.

9 Claims, 20 Drawing Sheets

WORKFLOW REAL TIME INTERVENTION

This is a continuation of application Ser. No. 08/315,469 filed on Sep. 30, 1994, now abandoned.

CROSS-REFERENCE TO RELATED APPLICATIONS

This application is related to application Ser. No. 08/858,957 which is a continuation of Ser. No. 08/316,264, now U.S. Pat. No. 5,768,506, filed concurrently herewith, for *Method and Apparatus for Distributed Workflow*, of Jim Randell. This application is also related to application Ser. No. 08/315,390 filed concurrently herewith, for *Method and Apparatus for Distributed Workflow Building Blocks of Process Definition, initialization, and Execution*, of Jim Randell.

FIELD OF THE INVENTION

This invention relates to computer systems and more particularly to work distribution systems within such computer systems. Even more particularly, the invention relates to distributed workflow systems.

BACKGROUND OF THE INVENTION

Process automation (Workflow) software is used in systems which are by their very nature definable and governed by a series of policies and procedures. For example, workflow software can be used for procedures such as insurance claims processing, mortgage loan processing, and engineering change orders. The basic premise of a workflow software system is that a company has developed a prescribed set of policies and procedures for these activities which results in an acceptable level of business risk and return. That is, the procedure is well defined.

The policies may exist for efficiency reasons, that is, a more efficient business would be more competitive, or because there is a financial exposure requiring consistency in the performance of the work, or these policies can sometimes be driven by the customers of a business.

The activities based upon the procedures are completed day in and day out with little variation with how the work is performed. Errors can occur while processing an instance of a procedure, however, and when errors occur, a way is needed to perform part or all of the work for the instance a second or subsequent times.

Workflow systems are often defined for work which is basically clerical in nature, therefore requiring a simple user interface, and also requiring that the person performing the work be unconcerned with where the work came from or where the work goes to after they have performed their particular part of the activity. Prior art workflow systems provide a definition of each activity to be performed during the process, and provide the routing information to allow work to be routed from one person to another between activities. This presents a problem, however, if some portion of the work is not very well defined within an organization so that the routine is undefined or not well defined. Therefore, prior art systems fail to meet the needs of organizations which cannot rigorously define the procedure.

Another limitation of prior art systems is that within a procedure, they define a person or job title for each activity of work to be performed. Thus, if the organization changes, the procedure definition becomes outdated. This requires that the procedure be rewritten to conform to the new organization definition.

Another limitation of prior art systems is that they move information between the people performing the work either through electronic mail, or by storing all the work in a database which each person can access. That is, the means for moving information is an integral part of the system.

There is need in the art then for a workflow system that allows a user to define the procedure for completing work, while also separating the definition of the entity that will complete each activity of the work from specific individuals who will perform work on the activities. Another need in the art is to provide a way to allow an intervention in the processing of an instance to perform exceptional conditions. Still another need in the art is to provide a way to allow some portion of a procedure to be defined in an ad-hoc manner while still containing the overall procedure within the workflow system. A still further need is for a workflow system that provides a separation between the decision making area of the system and the information movement area of the system. The present invention meets these and other needs in the art.

SUMMARY OF THE INVENTION

It is an aspect of the present invention to provide a system, defined as a method, for defining the workflow necessary to complete a work procedure, and manage the workflow for each instance of the procedure.

It is another aspect of the invention to provide a system for defining a work procedure.

Another aspect is to provide a system for controlling the workflow routing for each instance of a procedure submitted to the system.

Another aspect is to separate the method of defining which entity should perform work from the process of identifying a specific person as the entity.

Another aspect of the invention is to provide a way to perform work a second or subsequent times when errors occur.

Still another aspect is to separate the decision making area of the system from the information delivery area of the system.

A still further aspect is to provide a way to allow some portion of the procedure to be performed ad-hoc, wherein the specific routing of the work for the ad-hoc portion is left undefined.

The above and other aspects of the invention are accomplished in a process automation, or workflow, system that automates the definition and execution of a procedure, wherein the procedure can be carried out according to defined rules among agents. Agents may be individual users, work groups, organizations, or automatic systems, such as production machines or other software processes. Automation is used to guarantee that all the individual activities are taken in the defined sequence, form, and time.

The overall architecture of the present invention splits the three basic elements necessary to perform a procedure—the procedure definition, the organization definition, and the system transport definition. The procedure definition defines which activities must be performed, and the sequence in which the activities must be performed. The organization definition is used to identify a particular agent to perform a task within a procedure. The selection can be made when the procedure is defined, or it can be deferred until performance of an instance of the procedure. The system transport definition is used to move information between agents and an information service while processing an instance of the procedure.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
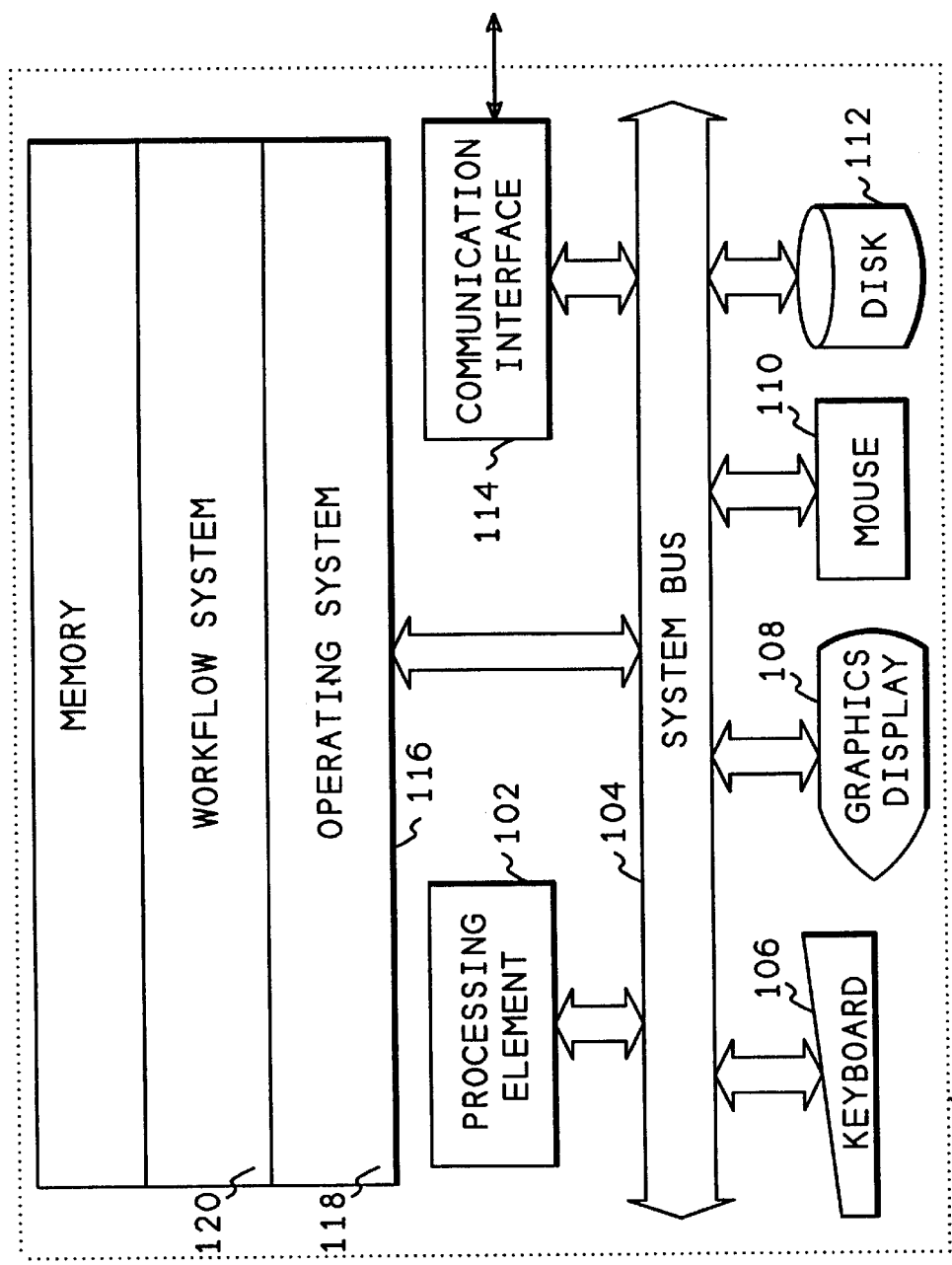
FIG. 1 shows a block diagram of a computer system incorporating the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

Process automation (workflow) is used to automate procedures which must be carried out according to defined rules among participants. Participants may be individual users, work groups, organizations, or automatic systems, such as production machines or other software processes. All of the participants must fulfill specific tasks in order to complete the overall procedure. Automation is used to guarantee that all the individual activities are taken in the defined sequence, form, and time.

The overall architecture of the present invention splits the three base elements necessary to perform a procedure:

the procedure/task definition the organization definition the system transport definition The procedure definition defines which activities must be performed, and the sequence in which the activities must be performed. Procedures are defined using nodes, which represent activities of the procedure. Nodes are comprised of work nodes, routing nodes, modifier nodes, generator nodes, detector nodes, and timer nodes. Within these nodes there may be rules that define entry conditions for starting the node, exit conditions to be checked after the node is complete. Each performance of a procedure is called an instance.

The organization definition is used when an instance is performed. Agents used to perform each activity within a procedure can be an individual person, a group of people, an application program, a physical machine, etc. A logical definition of the agent necessary to perform an activity is kept within the procedure, however, when an instance is performed, rules within the organization definition are used to bridge between a logical agent and a physical agent. The organization definition is also used to define whether the information can be moved simply by giving an agent the identity of the information within the database, or whether the information must be physically sent, for example, over a local area network or through an electronic mail system, to the agent that will perform the next activity.

The system transport definition is used to move information between agents and an information service within the processing of an instance, as the movement has been defined in the organization definition.

The following terms will be used throughout the following specification and claims:

Coordination service—the coordination service acts on behalf of the owner of an instance of a procedure and determines when each activity of the instance should be dispatched to an agent. It uses the organization service to determine the identity of the agent and then uses the transport service to send information for the activity to the agent.

Organization service—the organization service determines the exact agent to which a particular activity should be dispatched. If the activity can only be performed by a specifically identified agent, identifying the agent is trivial. However, if the activity is defined to be performed by a group of agents, the organization service must determine which particular individual within the group is to receive the task or whether the task is to be sent to the entire group. The organization service also provides information that determines which transport service to use. The organization service may be internal to the work flow system or may be an external system to which the work flow system communicates.

Transport service—the transport service handles the movement of information between agents and the coordination service. After the coordination service determines an activity needs to be dispatched to a particular agent and identifies the particular agent through the organization service, the coordination service then contacts the transport service to actually get the activity and its information delivered to the agent. The organization service determines whether the delivery can be through the information service, through electronic mail services, or through some other method, and the transport service uses the determined method to deliver the information.

Information service—the information service stores and retrieves all data used within the work flow system. This would typically be a database system, however, it may also be any other type of file, or any number of files or databases.

Procedure—a procedure describes the activities and functions within the activities necessary to process a particular type of work. For example, if the work flow system will be used to process a loan application, a procedure would be created which defines each activity or step required to process a loan application, and each function that is to be performed within each activity. Functions may be defined as a manual process, a computerized process, or a combination of the two.

Instance—an instance is one particular performance of a procedure. For example, if the procedure is for processing a loan application, an instance is the processing of a loan application for one particular individual.

Pattern—a pattern describes the initial information content that will be placed in the information service when an instance is started, and provides a placeholder for information created while the process is executing. In addition, a pattern can specify the visibility of each item of data in the pattern, that is, which nodes will have access to each data item identified in the pattern. This allows the procedure creator to restrict the information each agent will be able to see, to provide additional security for data.

Work node—a work node contains the definition of an activity within a procedure when the activity is not performed by the workflow system. That is, there is a work node for each activity of a procedure if the activity must be completed by an agent, as opposed to the activity being performed within the work flow system. A work node is processed only once during a procedure, unless is identified for reprocessing by a modifier node, or it is reprocessed because the procedure is suspended and then manually activated at a location which causes the work node to be reprocessed.

Routing node—a routing node is an activity within a procedure wherein the work flow system decides which subsequent activities (nodes) of the procedure are to be performed.

Modifier node—a node that determines which other nodes must be performed again when an error occurs, and resets these other nodes to allow them to perform work a second time, and to notify them that the work is being processed a second or subsequent time.

Timer node—a timer node is a part of a procedure wherein the work flow system sets a time limit, to allow the procedure to know when something has not been completed. When the time limit expires, the timer node fires its output, and typically, this output will be connected to an input of a routing node, which determines what to do when the time expires.

Generator Node—a generator node sends information from an instance of one procedure to an instance of another procedure through a logical channel. These nodes are typically used to send synchronization information to an instance of another procedure.

Detector Node—a detector node receives information from an instance of another procedure through a logical channel. These nodes are typically used to receive synchronization information from another procedure.

Agent—an agent performs work defined by a work node, and may be an individual user, a group of users, an automated process, a machine, or a manual process.

Logical Channel—also called a channel, allow instances of processes to communicate by allowing event generator nodes to communicate to event detector nodes. Channels allow an abstraction of the implementation of a procedure, by only specifying the important events during the execution of the process. This means that the designer of a process does not need to know the precise implementation of another process at the time the processes are defined, in order to synchronize the two processes.

FIG. 1 shows a block diagram of a computer system containing the present invention. Referring now to FIG. 1, the computer system 100 contains a processing element 102 which communicates to other elements of the computer system 100 over a system bus 104. A keyboard 106 allows text input to the computer system 100 and a mouse 110 allows graphical locator input to the computer system 100. A graphics display 108 provides for graphics and text output to be viewed by a user of the computer system 100. A disk 112 stores an operating system and other data used by the computer system 100, for example the information service could reside on the disk 112. A memory 116 contains an operating system 118, and the workflow system 120 of the present invention.

As will be described more fully below, the computer system 100 may communicate to other computer systems (not shown) through communications interface 114, to allow the other computer systems to perform tasks assigned to various agents of the workflow system. For example, the communications interface 114 may be a connection to a local area network (LAN). Thus, in the workflow system, all agents may use a single computer, each agent may use a separate computer connected through the communications interface 114, or the system may be a combination of multiple agents on some computers, with some agents having separate computers.

Figure 2:
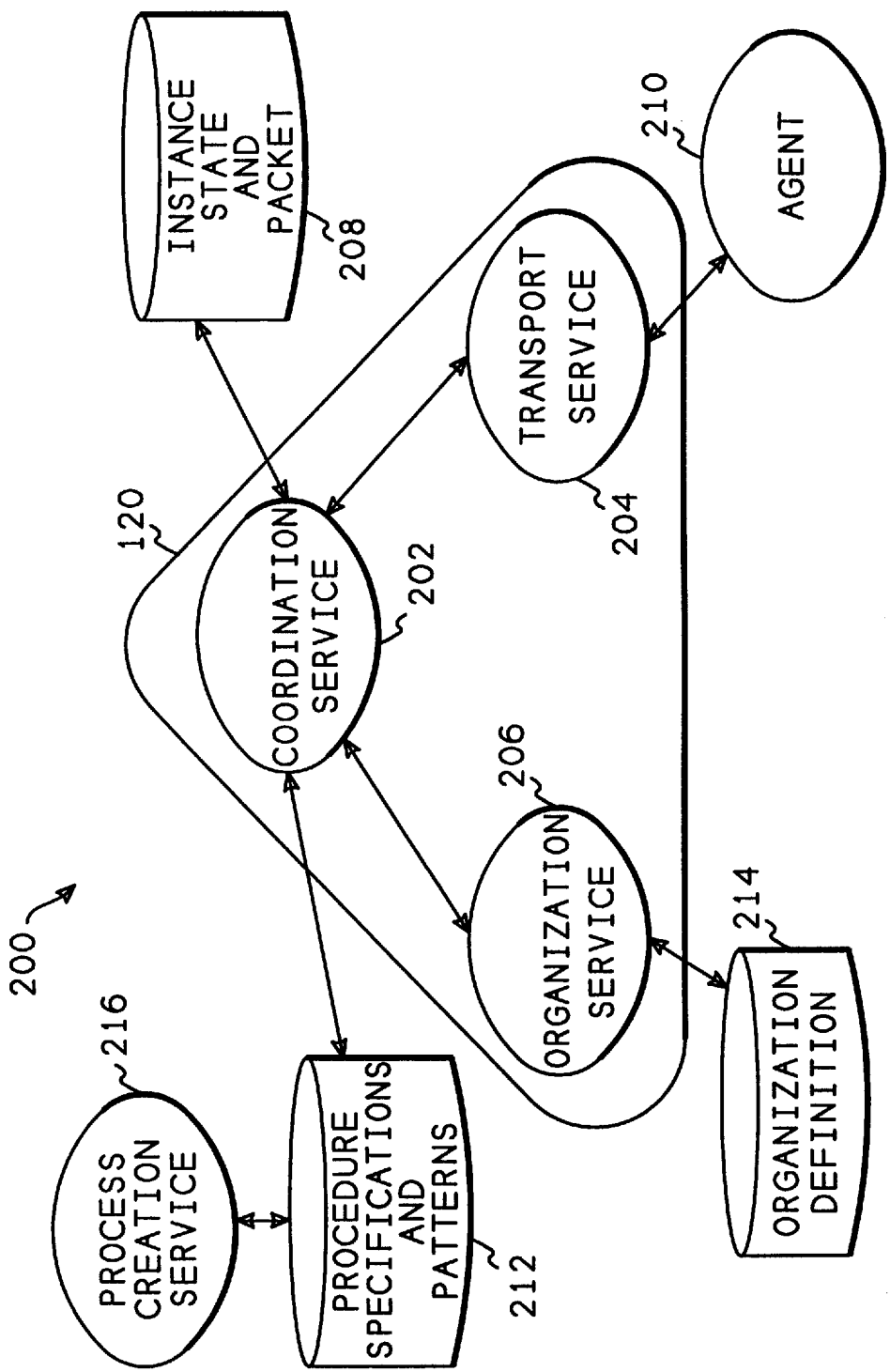
FIG. 2 shows a symbolic diagram of the sub-systems within the invention.

FIG. 2 shows a diagram of the architecture of the system of the present invention. Referring now to FIG. 2, the workflow system 200 is comprised of workflow execution software 120 and procedure creation software 216. The procedure creation software 216 is a graphical user interface used to define a procedure and to store the definition into the procedure specifications and patterns database 212. The procedure creation software is described below with respect to FIGS. 5 through 9. Processes within the workflow system may also be created using subroutine calls to the Application Programming Interface (API) of the workflow system, through a macro language which provides another way to perform the API subroutine calls, and possibly through a process definition language. The graphical user interface is, however, the best way of creating a process.

The workflow execution software 120 contains coordination service software 202, transport service software 204, and organization service software 206, however, the transport service software and organization service software can be outside the workflow system. The coordination service software 202 accesses procedure specifications from a database 212 as well as storing and accessing instance state and packet information within a database 208. The databases 212 and 208 may be the same database or they may be separated. When the coordination software service 202 starts a task within an instance of a procedure, it interfaces with organization software 206 to identify a specific agent to perform the task. Organization service software 206 may access an organization definition database 214 to determine the exact agent, and other information such as security, which transport service to use, etc., and pass this information back to the coordination service software 202.

The coordination service software 202 then passes the information along with the agent's name to the transport service 204 which determines how to send the information to the agent, and then sends the information by some method to an agent 210. For example, when the agent has access to the database 208, the transport service software 204 might send the information by simply notifying the agent that the instance state and packet information is available in the database 208; or the transport service 204 might send the information over a local area network; or through electronic mail to the agent located in another computer system.

The workflow execution software 120 is described below with respect to FIGS. 10–16.

Figure 3:
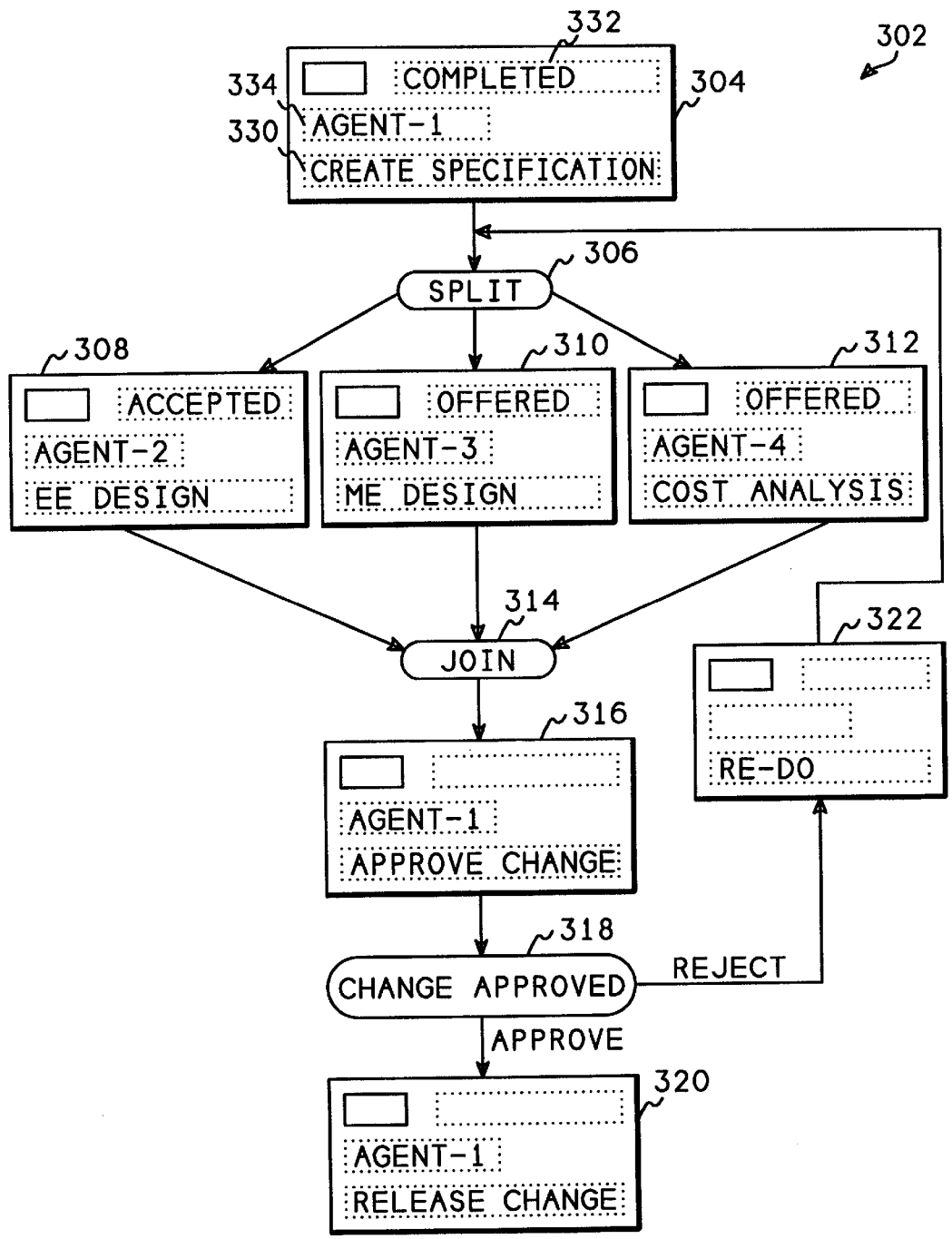
FIG. 3 shows an example procedure as it is being used to process an instance.

FIG. 3 shows an example of a procedure defined in the workflow system of the present invention. The example is illustrated as an instance of the procedure as the instance is being performed. The specific example of FIG. 3 is an engineering change order (ECO) procedure. Those skilled in the art will recognize from this example that many, if not all, other types of procedures could be implemented using the system of the present invention. As described below with respect to FIGS. 17–20, FIG. 3 may also have a menu for selecting manual coordination override functions as an instance is processed.

Referring now to FIG. 3, the engineering change order (ECO) procedure of the example of FIG. 3 is depicted using graphics wherein a box, for example the box 304, defines work nodes and modifier nodes, and an elongated circle, for example circle 306, represent routing nodes. Timer nodes, generator nodes, and detector nodes are not shown in this example.

Within the ECO procedure 302, the first activity is depicted by box 304 and labeled within dotted line 330 as CREATE SPECIFICATION. Dotted line 334 surrounds the name of the agent assigned to complete the work node 304 as AGENT-1. Dotted line 334 shows the status of the task assigned to this node and indicates that the task has been COMPLETED. Routing node 306 splits the specification created by work node 304 to allow three additional work nodes to perform parallel operations within the procedure. Although these tasks can be performed in parallel in this example, they do not have to be performed in parallel, and in fact, any combination of the nodes at the end of the arcs may be executed. The system is not restricted to a single choice or enforced parallelism for all nodes. The system allows any number of following nodes to be executed and the system can also dynamically use data in the instance to decide which node(s) to execute next.

The graphics shown in FIG. 3 do not indicate which portions of the information associated with the instance is sent to each of the three work nodes 308, 310 and 312. The details of what types of information are sent to the three nodes is defined using the pattern definition. Typically, the create specification work node 304 would create three different pieces of information, an electrical design specification, a mechanical design specification, and cost information. The electrical design specification would be sent to the EE design work node 308, the mechanical design specification would sent to the ME design 310 and the cost information would be sent to the cost analysis work node 312. As shown within the work nodes, the EE design work node has been assigned to AGENT-2, the mechanical engineering design work node 310 has been assigned to AGENT-3, and the cost analysis work node 312 has been assigned to AGENT-4. As also shown within the graphics for the work nodes, the agent assigned to EE design work node 308 has accepted the information sent to the agent, therefore, the agent can start the work. The agents for the ME design work node 310 and cost analysis work node 312 have both been offered the information but have not yet accepted it.

The process of offer and acceptance allows an agent to examine the information sent to them before accepting it so that if the information is incorrect or incomplete, it can be returned to the prior node for completion or correction. The acceptance process can be performed by entry condition testing within the workflow system, as will be described below.

Once the work nodes 308, 310, and 312 have completed work on the three pieces of information sent to them, the JOIN routing node 314 will then activate the APPROVE CHANGE work node 316. The node 314 could wait for all previous nodes to complete, or any combination to complete, before proceeding. The combinations of nodes that a routing node waits for before activating the outgoing paths may be dynamically determined by information in the instance, as can the combination of outward paths that is activated by the routing node. Work node 316 indicates that AGENT-1 will perform the change approval process, however, this is coincidental and any agent could perform any step of any process. An agent can also be assigned to a collection of work nodes when the instance is executed.

After the APPROVE CHANGE node is completed, a CHANGE APPROVED routing node 318 will examine the results and if the agent performing the APPROVE CHANGE node approved the change, the information from the instance will be passed to RELEASE CHANGE work node 320. If, however, the change is not approved, routing node 318 will send the information to RE-DO modifier node 322. Since the change was not approved, something must be incorrect with respect to the change, and the RE__DO node 322 will modify the information packet for the instance so that it can be reprocessed by the work nodes 308, 310, and 312. Re-doing work is not the same as doing the work the first time. For example, the workflow system needs know that the work has been done once, in order to reset all intervening nodes so that they can be re-executed.

Figure 4:
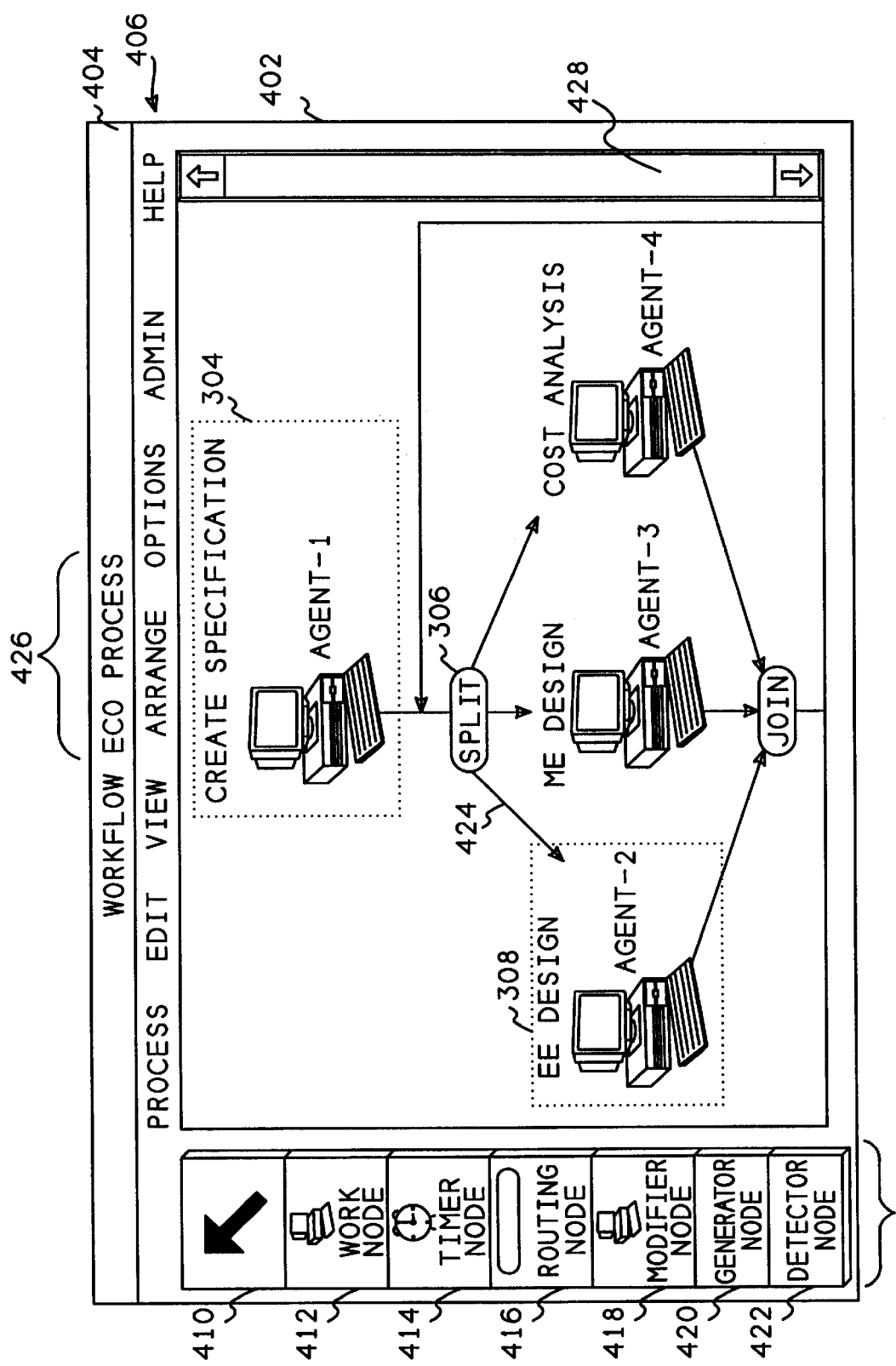
FIG. 4 shows a window used to define the procedure of FIG. 3.

FIG. 4 shows a window used to create or maintain a procedure description within the present invention. Such a window might be used within any number of operating systems, such as the Unix operating system and X-windows, Microsoft(R) Windows, OS/2, Apple Macintosh, etc.

Referring now to FIG. 4, the screen 402 contains a title 404, with a section 426 that indicates that the screen display is for the engineering change order procedure described above with respect to FIG. 3. A menu bar 406 shows some of the options available to the user of the window, such as PROCESS, EDIT, VIEW, ARRANGE, OPTIONS, ADMIN, and HELP. The PROCESS menu option allows a user to retrieve a procedure for display and editing, and to save the procedure once the editing is complete. The EDIT menu option typically provides CUT, COPY, and PASTE options, and the VIEW menu option typically defines how much of the procedure is depicted within the window at a given time. The ARRANGE menu option allows the user to arrange the nodes of the procedure in the order the user desires. The OPTIONS and ADMIN buttons provide user options such as, for example, changing the owner of an instance of the procedure, adding new users, etc. The HELP button displays help information to a user of the system.

A tool bar 408 provides an icon and an option for each node that can be placed in a procedure, as well as providing a button that allows a user to draw an arc (connecting line) between nodes. Icon 410 is the arc button and, when pressed, allows the user to identify two nodes. The system then draws a line between the two nodes. For example, the user might press the arrow icon 410 and then identify the SPLIT node 306 as well as the EE DESIGN node 308 to cause the system to draw the line 424. The WORK NODE icon 412 allows the user to place a work node on the diagram, the TIMER node 414 allows the user to place a timer node on the diagram, the ROUTING node 416 allows the user to place a routing node on the diagram, the MODIFIER node 418 allows the user to place a modifier node on the diagram, the event GENERATOR node 420 allows the user to place an event generator node on the diagram, and the event DETECTOR node 422 allows the user to place an event detector node on the diagram. The scroll bar 428 indicates that additional areas of the procedure are available for display on the diagram. Using the toolbar 408, the user can construct a complete diagram of the procedure to be performed.

Figure 5A:
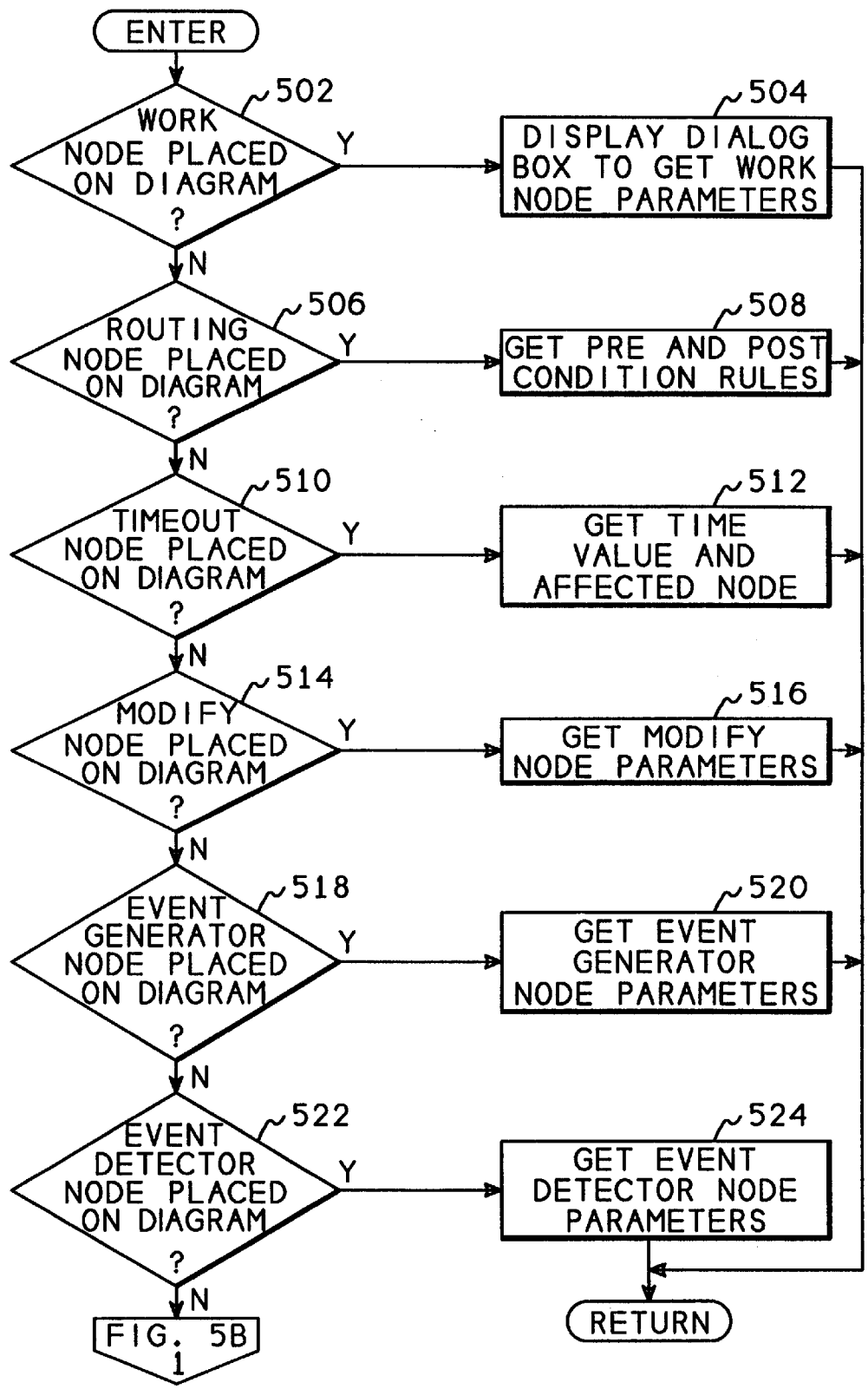
FIGS. 5A and 5B show a flowchart of the process of defining a procedure using the window shown in FIG. 4.
Figure 5B:
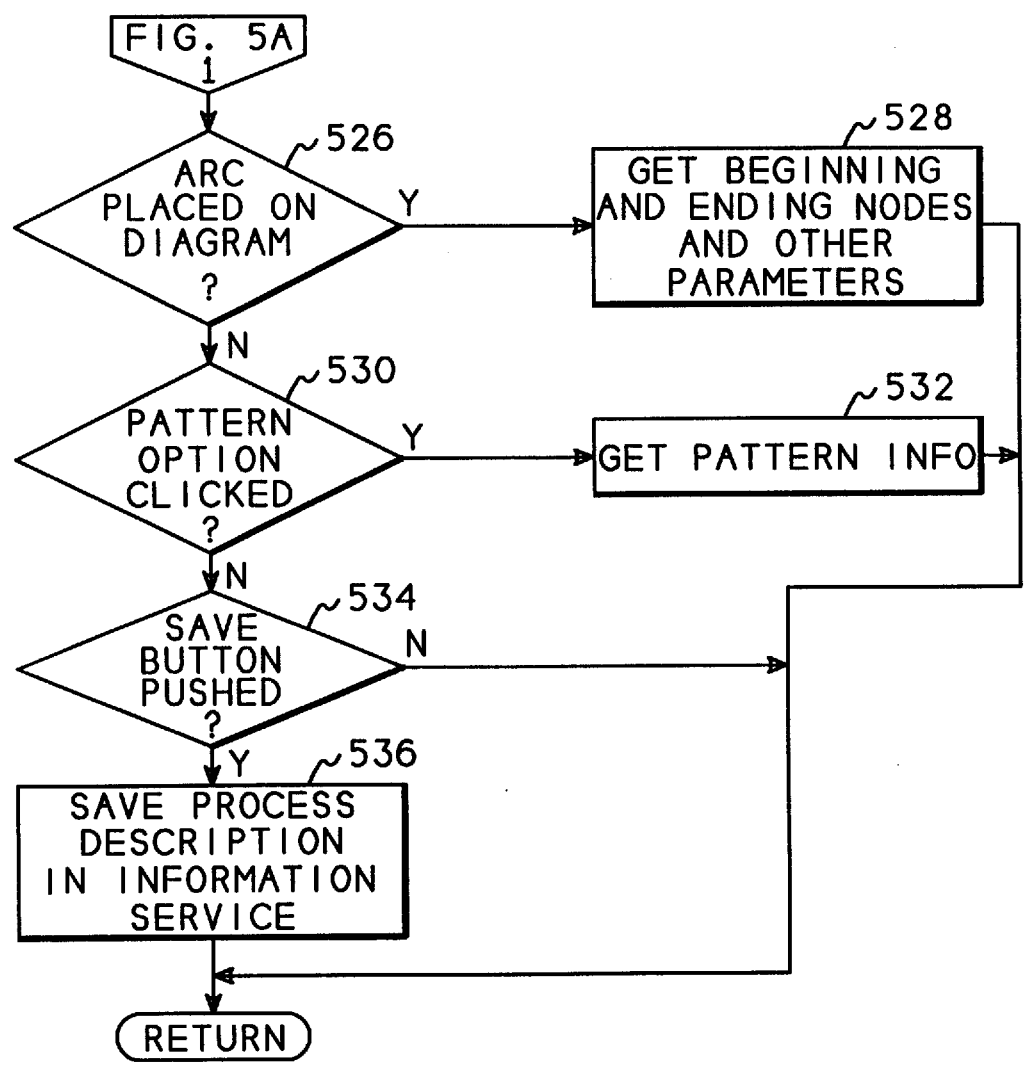

FIGS. 5A and 5B show a flowchart of the processing performed when the various toolbar buttons and edit buttons are pressed by a user of the system using the window of FIG. 4. Referring now to FIG. 5A, each time the user presses one of the buttons or menu options, typically by clicking the left mouse button when the mouse sprite is located over one of the toolbar buttons, FIG. 5A is entered at block 502. Block 502 determines whether a work node has been placed on the diagram, and if so, transfers to block 504 which displays the dialog box of FIG. 6 to get the parameters for the work node. After displaying the dialog box and retrieving the parameters, control returns to the windows system to wait for another mouse click.

Figure 7:
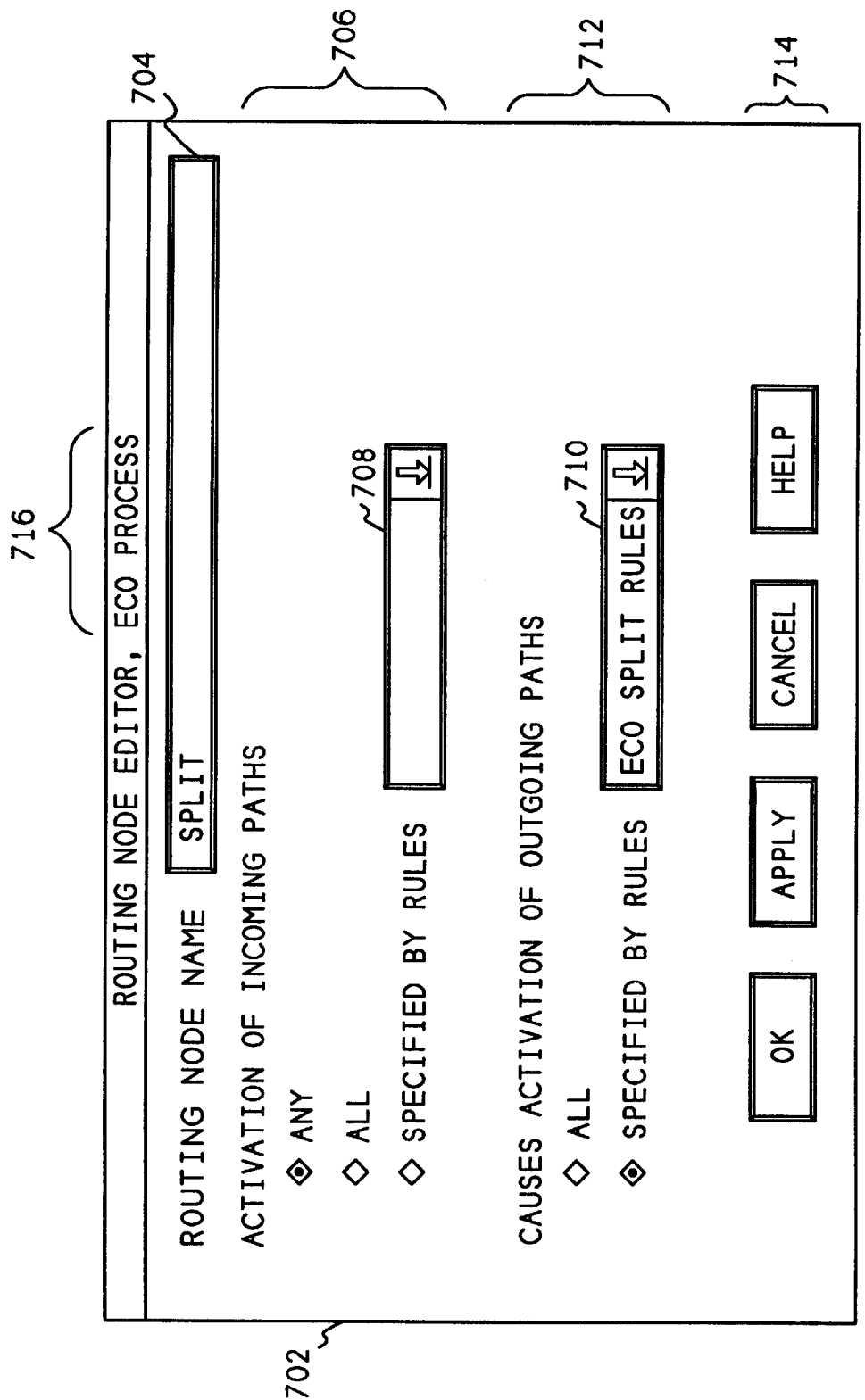
FIG. 7 shows a windows dialog box for a routing node editor, as might be used by the process of FIGS. 5A and 5B.

If the mouse click was not for a work node, block 502 transfers to block 506 which determines whether the user placed a routing node on the diagram and if so, transfers to block 508 which displays the dialog box of FIG. 7 to get the entry condition and exit condition rules for the routing node. Control then returns to the windows operating system.

If the user did not click the routing node, block 506 goes to block 510 which determines whether the user clicked a timer node. If so, block 510 transfers to block 512 which displays the dialog box of FIG. 9 to get the values for the timer node. Control then returns to windows.

If the user had not clicked a timer node, block 510 transfers to block 514 which determines whether the user clicked the modifier node. If so, block 514 goes to block 516 which displays the dialog box of FIG. 8 to get the parameters for a modifier node and then returns to the windows operating system.

If the user did not click a modifier node, block 514 transfers to block 518 which determines whether an event generator node has been placed on the diagram. The event generator node causes events to be sent from an instance of one procedure to an instance of another procedure within the workflow system. That is, if a procedure can only be partially completed before work has to be done in some other procedure of the system, the event generator node causes the other procedure to signal when the work has been completed to allow the first procedure to continue. If the user has clicked an event generator, block 518 transfers to block 520 which displays a dialog box (not shown) to get information for creating the event generator node. Control then returns to windows.

If the user had not clicked the event generator node, block 518 transfers to block 522 which determines whether the user had clicked an event detector node. The event detector node is the counterpart to the event generator node described above. When two procedures need to communicate, the procedure sending the communication uses an event generator node, and the procedure receiving the communication uses an event detector node to detect when the information arrives. If the user has clicked the event detector node, block 522 transfers to block 524 which displays a dialog box (not shown) to get information to complete the event detector node. Control then returns to windows.

If the user had not clicked the event detector node, block 522 transfers to block 526 (FIG. 5B) which determines whether the user had clicked the arc icon 410. If so, block 526 transfers to block 528 which displays a dialog box (not shown) allowing the user to name the beginning and ending nodes for the line to be drawn. Alternatively, the user may draw the line by holding the mouse button down and moving the mouse pointer between the two nodes. After getting the information identifying the two nodes, control returns to windows.

If the user had not clicked the arc tool button icon, block 526 transfers to block 530 which determines whether the user had clicked the pattern option displayed when the user clicks the options entry on the menu bar. If so, block 530 transfers to block 532 which displays a dialog box (not shown) to get information regarding the pattern for the procedure. A pattern is a definition of all the information that is created when an instance of a procedure is started, and it also provides placeholders for information created during execution of the process. For example, in a loan application procedure, the pattern might be comprised of a loan application form. When an instance is created to process a loan application for an individual, the loan application pattern form is copied from the procedure description into an information packet specific to the particular instance of the procedure. Subsequently, in work nodes that follow within the procedure, the loan application would be completed. Patterns also create slots for holding data that will be created during execution of the instance.

After retrieving information to define the pattern information, block 532 returns to windows. If the pattern option has not been clicked, block 530 transfers to block 534 which determines whether the save button has been pushed. If the save button has not been pushed, control simply returns to windows. Otherwise, block 534 transfers to block 536 which saves the procedure description in the information service, typically by storing the information into a database. The procedure description information is comprised of all the information displayed on the above described dialog boxes, including the interconnection information between the nodes and the pattern information necessary to create the initial forms.

Figure 6:
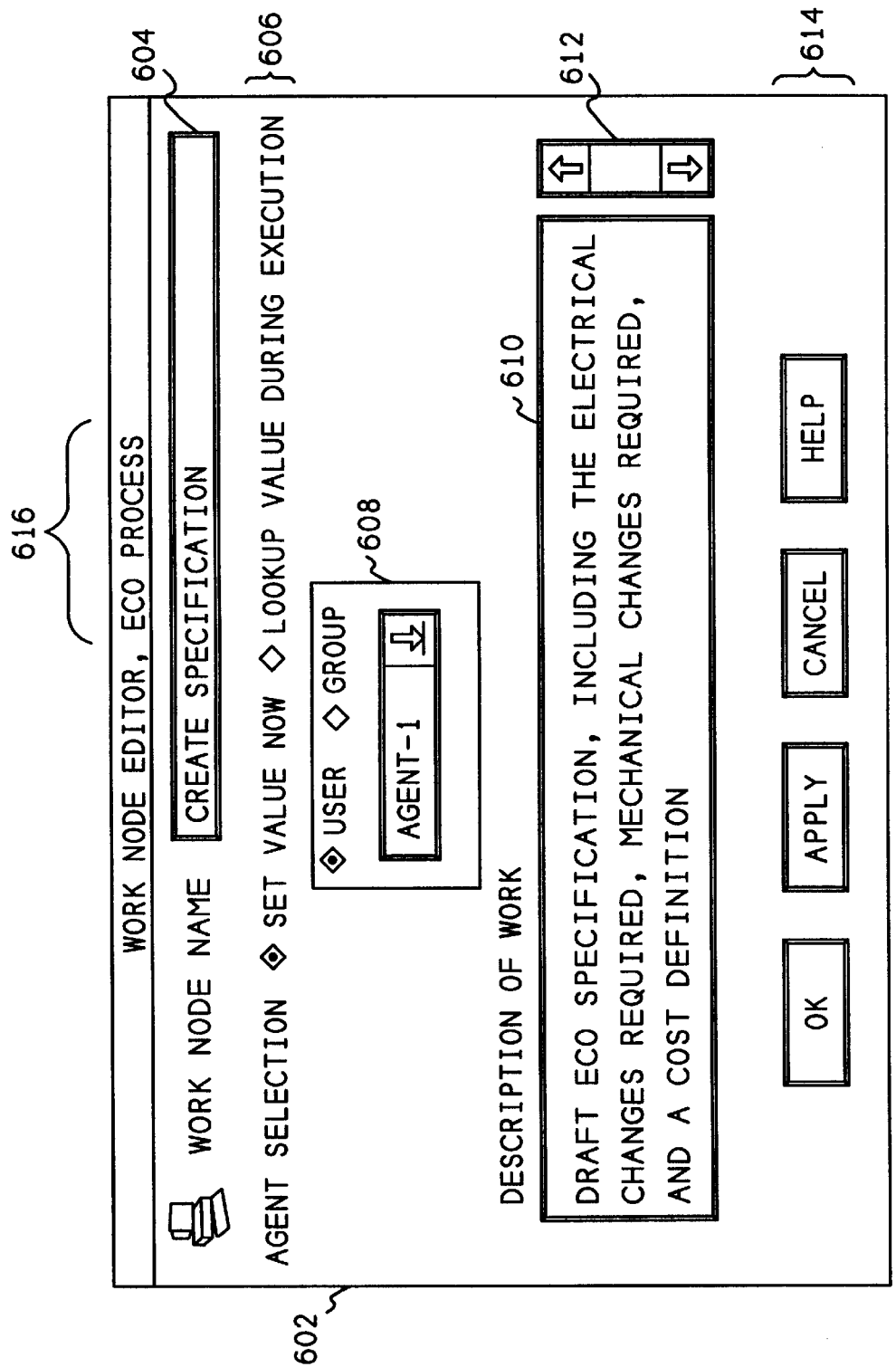
FIG. 6 shows a windows dialog box for a work node editor, as might be used by the process of FIGS. 5A and 5B.

FIG. 6 shows a diagram of the dialog box for obtaining work node parameters as used by block 504 of FIG. 5A. Referring now to FIG. 6, the window 602 contains a work node name field 604 which allows the user to enter the name used for the work node. For example, when the dialog box of FIG. 6 is used for block 304 of FIG. 3, CREATE SPECIFICATION is entered in the name field 604.

The area 606 of the screen 602 allows the user to specify whether the agent is selected when the procedure is created or whether the agent is selected by the organization service when the task is created during performance of an instance. For the example shown in FIG. 6, the agent would be selected at the time the procedure is created.

The area 608 shows that AGENT-1 has been selected and AGENT-1 is identified as an individual user rather than a group.

Box 610 shows an area which allows the user to enter and edit a textual description of the work be done while creating the specification. In this example the activity associated with the create specification node includes drafting a specification for the electrical changes required, mechanical changes required, and a definition of the costs involved in the engineering change order. The scroll bar 612 indicates that the description of the work may be much longer than shown in this example.

The buttons defined in the area 614 allow the user to SAVE changes, CANCEL changes, or ask for HELP within the dialog. The area 614 has a counterpart on FIG. 7, FIG. 8, and FIG. 9 and the buttons perform the same functions on all these Figures.

FIG. 7 shows a dialog box for a routing node, which, for example, might be used by block 508 of 5A. Referring now to FIG. 7, the dialog box 702 contains a routing node name 704, which for this example shows the SPLIT node from block 306 of FIG. 3. The area 706 of the dialog box 702 allows the procedure creator to define when the routing node will be activated. The routing node can be activated when any prior node is complete, as in this example, or it can be activated only after all prior nodes have been completed, or it can be activated as defined by a set of rules, wherein block 708 defines the name of the set of rules.

Rules can be defined using any type of procedural language, for example, the BTR rule sets defined in International Patent No. PCT/GB92/01253. The rules could be defined in many different ways, for example a procedural programming language such as the "c" programming language could be used.

After a routing node is activated, as defined by the information in area 706, it will then activate nodes on its outgoing paths as specified by the area 712 of the dialog box 702. The area 712 shows that there are two options for activating outgoing nodes. The first is that nodes on all outgoing paths are activated, and the second option shows that activated nodes on the paths can be defined by a set of rules, wherein the name of the rules is specified in list box 710. The rules can be used to define how the information packet for the instance is split, for example as defined for the example of FIG. 3.

Area 714 defines the same buttons described above with respect to area 614 of FIG. 6.

Figure 8:
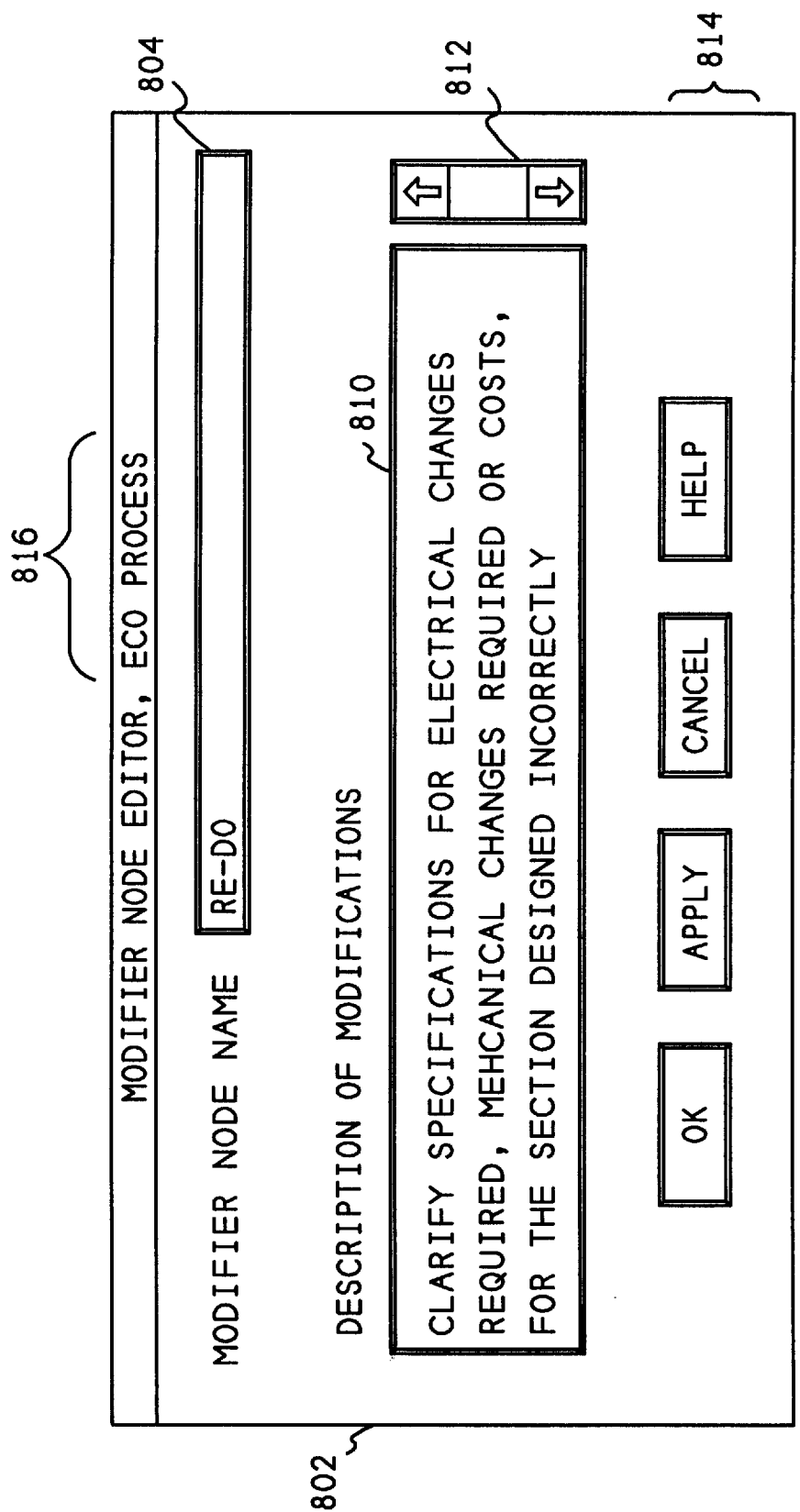
FIG. 8 shows a windows dialog box for a modifier node editor, as might be used by the process of FIGS. 5A and 5B.

FIG. 8 shows a modifier node dialog box as might be used by block 516 of FIG. 5A. Referring now to FIG. 8, the description in the edit control 810 defines how the information packet should be modified in order to be reprocessed. FIG. 8 shows an example for the modifier node 322 of FIG. 3, and indicates that the specifications that were incorrect in the routing node 318 should be modified and clarified before being reprocessed by the split node 306 and the work nodes 308, 310, and 312.

Figure 9:
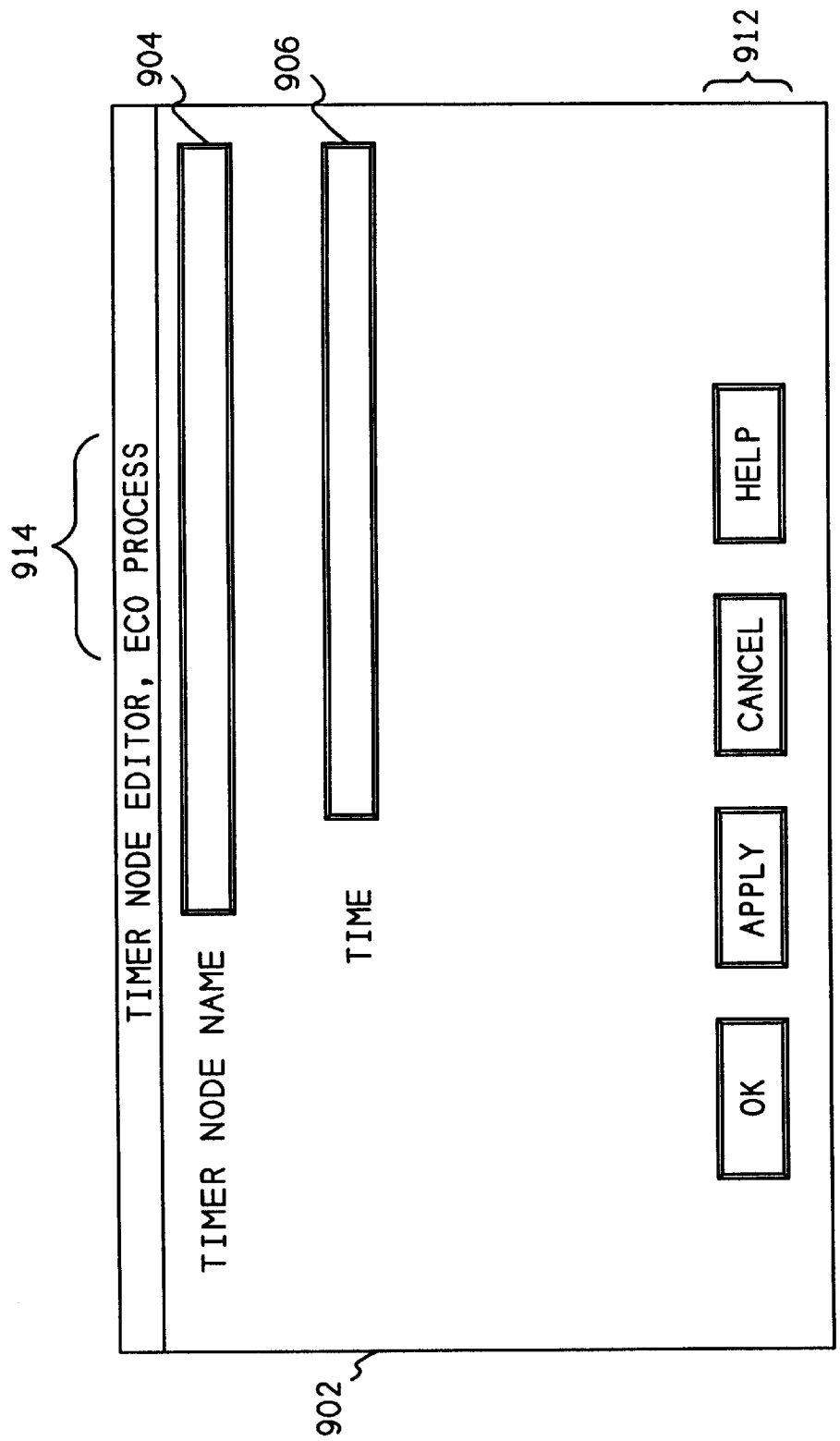
FIG. 9 shows a windows dialog box for a timer node editor, as might be used by the process of FIGS. 5A and 5B.

FIG. 9 shows a dialog box for the timer node editor as might be used by block 512 of FIG. 5A. Referring now to FIG. 9, the dialog box 902 contains an area 904 for indicating the name of the timer node. Area 906 allows the user to enter the time value for the timer node. When the timer node is executed, it starts decrementing the time value, and when the time value expires, the timer node will fire its output. The area 912 contains the same buttons described above with respect area 614 of FIG. 6.

Once a procedure has been created using the system described above with respect to FIGS. 5–9, the procedure can be used to perform instances to handle individual instances of the procedure. The flowcharts described below with respect to FIGS. 10–16 describe the system 120 depicted in FIG. 2 and the software associated with the coordination service 202, organization service 206, and transport service 204. When a user of the system starts an instance of a procedure, called animating the instance, the operating system calls the coordination service 202, starting with FIG. 10.

FIG. 10 shows a flowchart of the coordination service 202 of FIG. 2. Referring now to FIG. 10, when an instance is started, FIG. 10 is entered at block 1002. Block 1002 reads the procedure for the instance from the information service, specifically from database 212 (FIG. 2). Block 1004 then calls FIG. 11 to build the instance object. The instance object is comprised of an information packet which identifies all the data to be used within the processing of the instance as well as identification information for the tasks that will be created to perform each of the nodes of the procedure as well as the order for performing the tasks. After returning from FIG. 11, block 1006 places the start node(s) into the work queue for the instance.

Block 1008 then gets the next node(s) from the work queue, which will initially be start node or one of the start nodes. There can be more than one start node and more than one finish node within a procedure. If there is more than one start node, all will be started, but the order of starting is arbitrary. As the processing of the instance progresses, the next node in the queue will be the node that needs to be performed next within the definition of the procedure. As each node is completed during processing of the instance, the arc to the next node is used to determine which node is next placed into the work queue. Any node can be a finish node, and if a node is marked as a finish node, after processing of the node is completed, the procedure is stopped.

Block 1009 determines whether the node retrieved in block 1008 is marked as being suspended. A node will be marked as suspended when an instance is suspended by its owner. For a more complete description of this process, see FIG. 17 below. If a node is suspended, block 1009 goes to block 1011 which notifies the instance owner that the suspended node is in the queue. If the node is not marked as suspended, block 1009 goes to block 1010.

Figure 12:
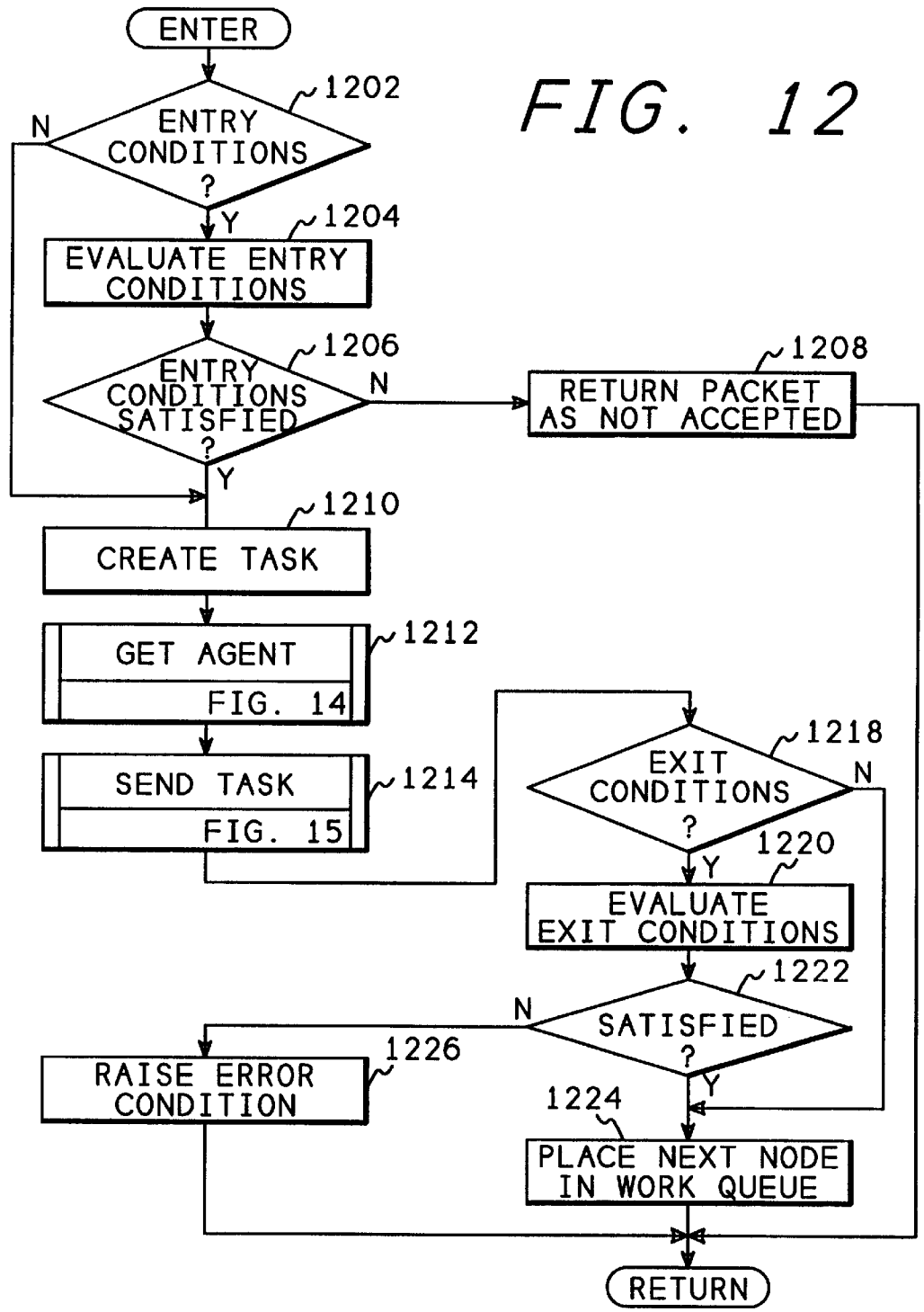
FIG. 12 shows a flowchart for the dispatch node process called from FIG. 10.

Block 1010 determines whether the node retrieved in block 1008 is a work node, and if so, transfers to block 1012 which calls FIG. 12 to create and dispatch a task to an agent to perform the work. The process shown in FIG. 12 sends the information packet to the agent, undispatches the information packet after the work has been completed and places the next node to be performed within the procedure into the work queue and sends a "new work" signal to the coordinator. Thus, after returning from FIG. 12, control goes back to block 1008 to retrieve the next node from the work queue.

If the node is not a work node, block 1010 goes to block 1014 which determines whether the node is a routing node. If the node retrieved in block 1008 is a routing node, block 1014 transfers to block 1016 which calls FIG. 13 to evaluate and process the routing node. The process of FIG. 13 will also place additional ready nodes into the queue, so when FIG. 13 returns, control goes back to block 1008 to get the next node from the work queue.

Figure 10A:
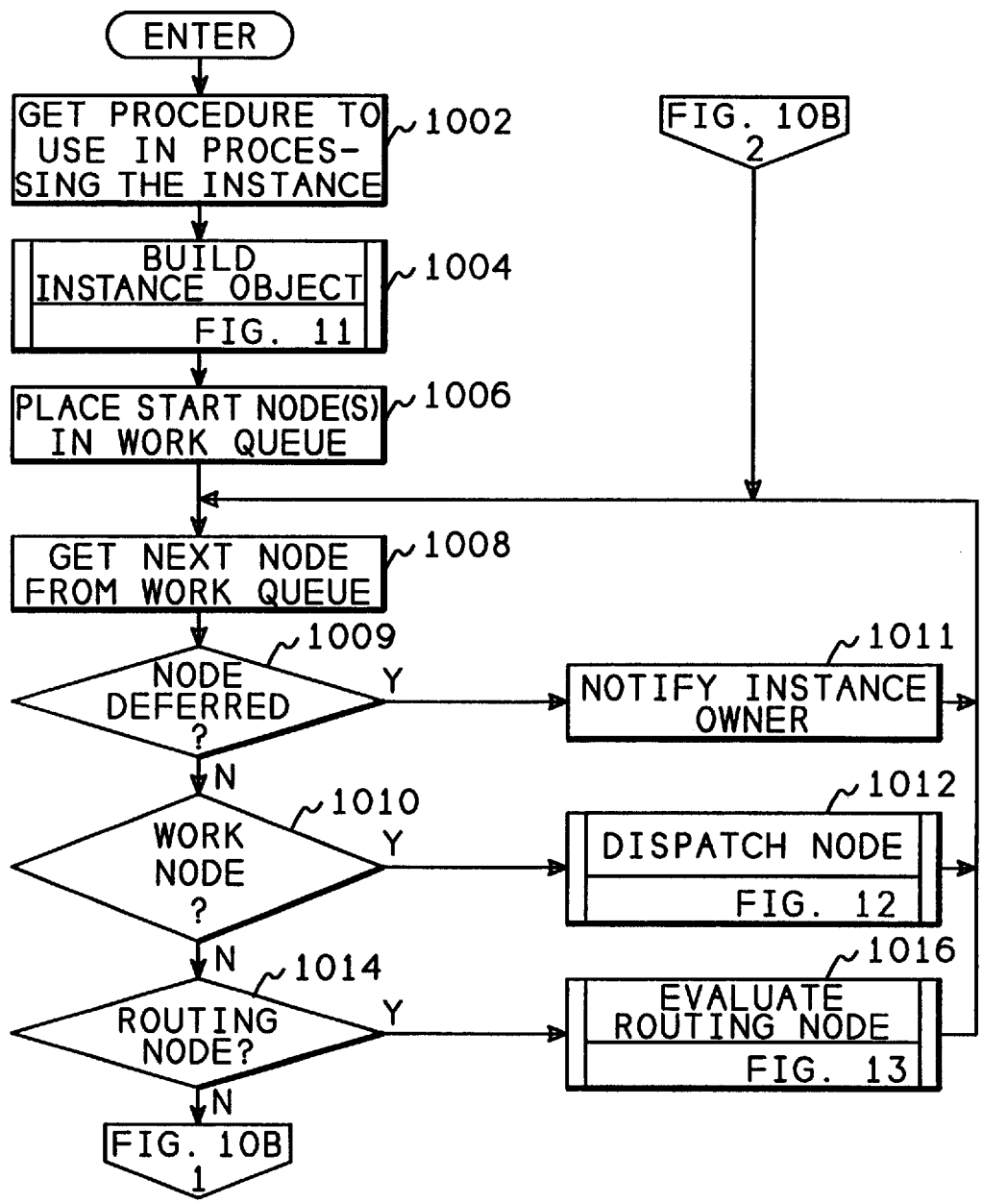
FIGS. 10A and 10B show a flowchart of the co-ordination service software.
Figure 10B:
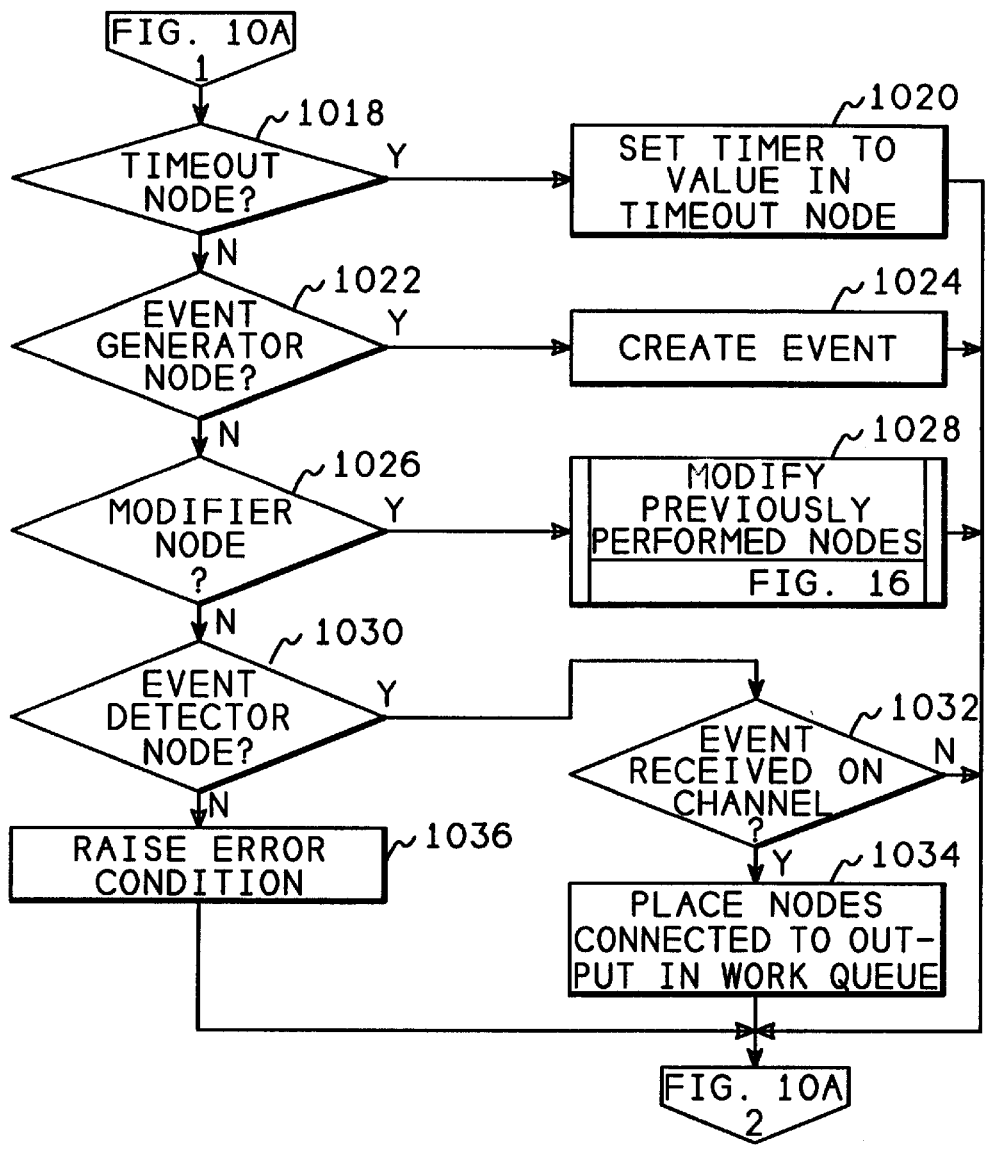

If the node is not a routing node, block 1014 transfers to block 1018 of FIG. 10B which determines whether the node is a timer node. If the node is a timer node, block 1018 transfers to block 1020 which sets a timer to the value in the timer node. Control then returns to block 1008 to get the next node from the queue.

If the node retrieved in block 1008 is not a timer node, block 1018 transfers to block 1022 which determines whether the node is an event generator node. If the node is an event generator node, block 1022 transfers to block 1024 which creates the event and sends it on a logical channel. Control then returns to block 1008 to get the next node from the work queue.

Logical channels allow event generator nodes and event detector nodes to communicate. When each of these nodes is created, it is connected to a logical channel. When an event generator node sends an event on a logical channel, the event is received by all event detector nodes that are connected to the logical channel.

If the node retrieved in block 1008 is not an event generator node, block 1022 goes to block 1026 which determines whether the node is a modifier node. If the node is a modifier node, block 1026 transfers to block 1028 which calls FIG. 16 to process the modifier node. Control then returns to block 1008 to get the next node from the work queue.

If the node retrieved in block 1008 is not a modifier node, block 1026 transfers to block 1030 which determines whether the node is an event detector node. If the node is an event detector node, block 1030 goes to block 1032 which determines whether an event has been received on the logical channel associated with the event detector node, and if so, control goes to block 1034 which places nodes connected to the output of the event detector node in the work queue before going to block 1008. If no event has been received on the logical channel, block 1032 transfers back to block 1008 to get the next work node for processing.

If the node retrieved in block 1008 is not an event detector node, block 1030 transfers to block 1036 which raises an error condition, since the node type is not known.

If the work queue is empty, block 1008 waits until new work arrives. The system will shut down, only when such a shut down is requested by the user of the system.

Figure 11:
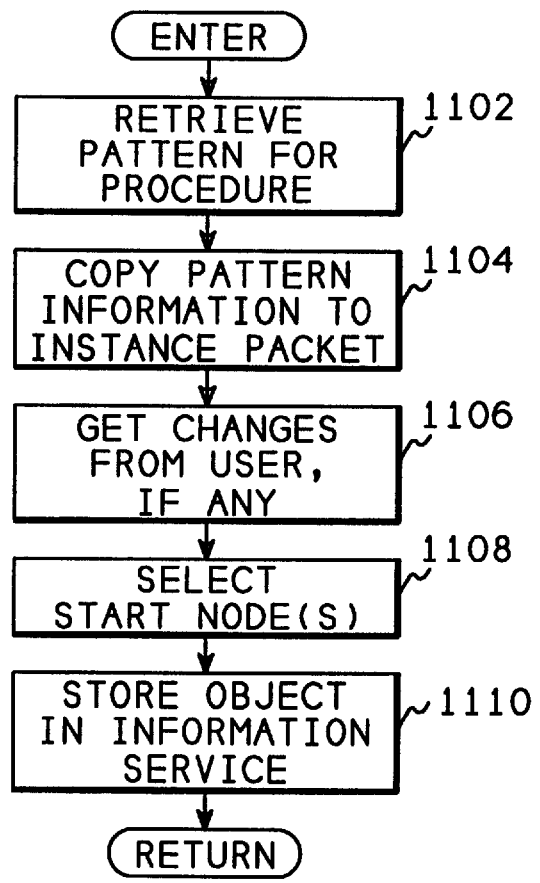
FIG. 11 shows a flowchart of the build instance object process called from FIG. 10.

FIG. 11 shows a flowchart of the build instance object process called from block 1004 of FIG. 10. Referring now to FIG. 11, after entry, block 1102 retrieves the pattern for the procedure, if one has been defined. Block 1104 copies each piece of information contained in the pattern to the instance information packet. Block 1106 then gets any changes from the user. This allows the user to change the instance before processing of the instance is started. This is optional, however, since the user is not required to make any changes. Block 1108 then selects the start node(s) for the procedure, and block 1110 stores the object in the information service and returns to FIG. 10.

FIG. 12 shows the dispatch task process called from block 1012 of FIG. 10. Referring now to FIG. 12, after entry, block 1202 determines whether there are entry conditions for starting the task. If so, block 1202 transfers to block 1204 which evaluates the entry conditions, and then block 1206 determines whether the entry conditions have been satisfied. An example of entry conditions, might be to determine whether all the information necessary to complete the work has been transferred to the agent. If block 1206 determines that the entry conditions have not been satisfied, control goes to block 1208 which returns the packet as not accepted.

Figure 14:
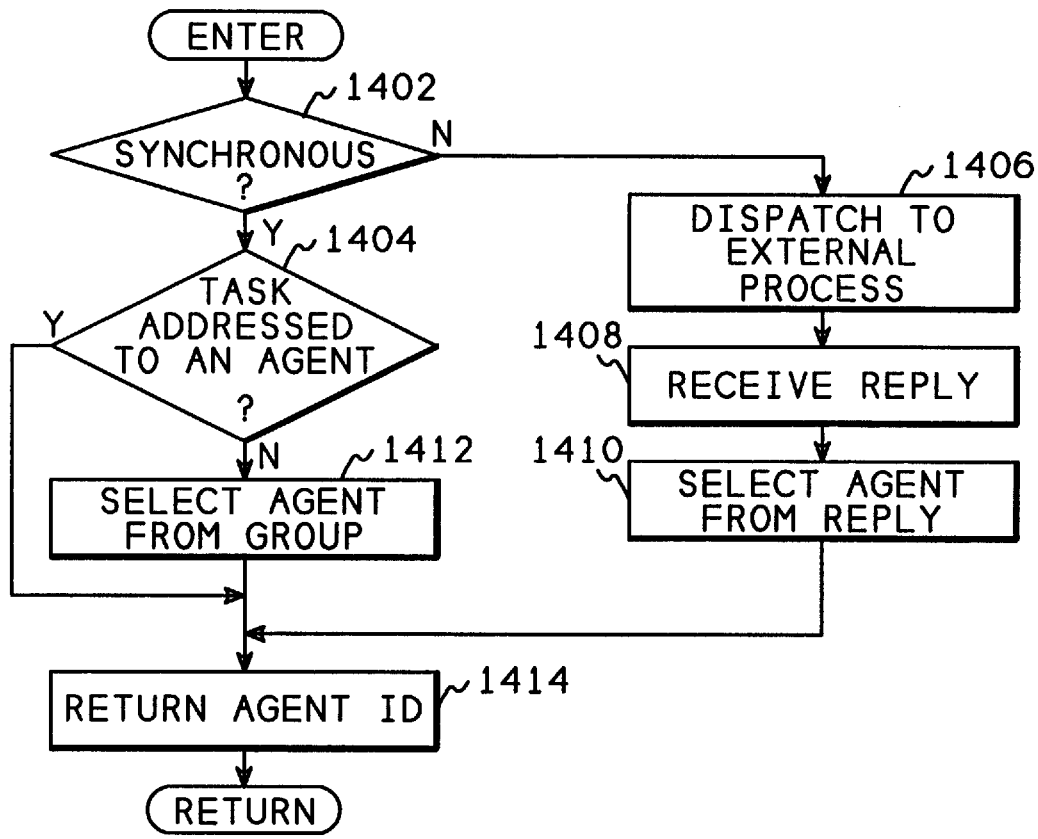
FIG. 14 shows the get agent process of the organization service software called from FIG. 12.

If the entry conditions are satisfied, or if there were no entry conditions, control goes to block 1210 which creates a task for the node of the procedure and block 1212 calls FIG. 14 to get an agent assigned to the task by the organization service. FIG. 14 shows a flowchart of the organization service 206 of FIG. 2.

Figure 15:
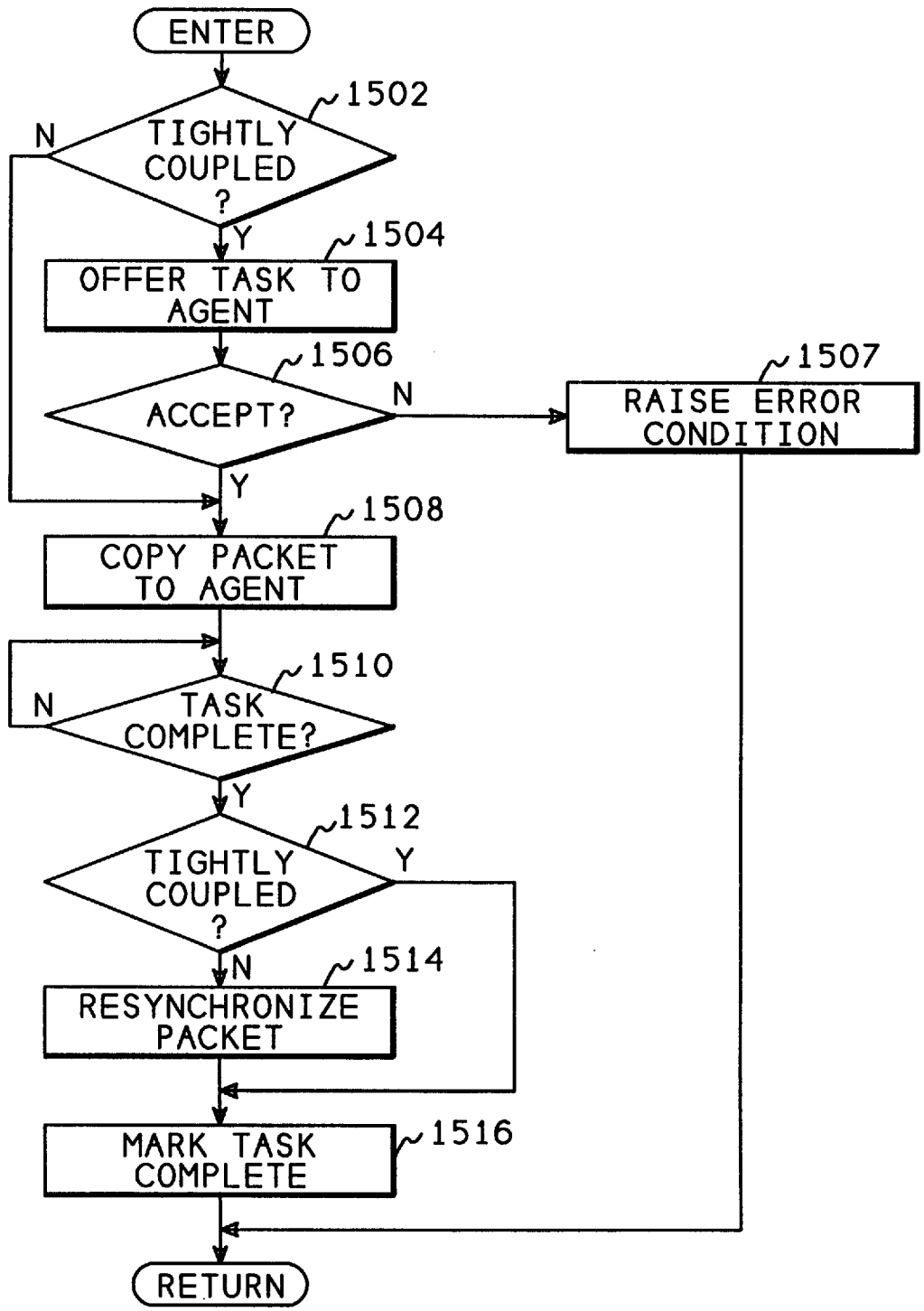
FIG. 15 shows the send task process of the transport service software called from FIG. 12.

After obtaining an agent ID, block 1214 calls FIG. 15 to send the task to the agent. FIG. 15 shows a flowchart of the transport service 204 of FIG. 2. When FIG. 15 returns, the task will have been sent to the agent, completed, and the information packet returned by the agent. Block 1218 determines if there are exit-conditions, and if there are, control goes to block 1220 to evaluate the exit-conditions, and block 1222 determines whether the exit-conditions have been satisfied.

If the exit conditions have not been satisfied, block 1222 transfers back to block 1226 to raise an error condition. If the exit-conditions are satisfied, block 1210 places the next node in the work queue before returning to FIG. 10.

Figure 13:
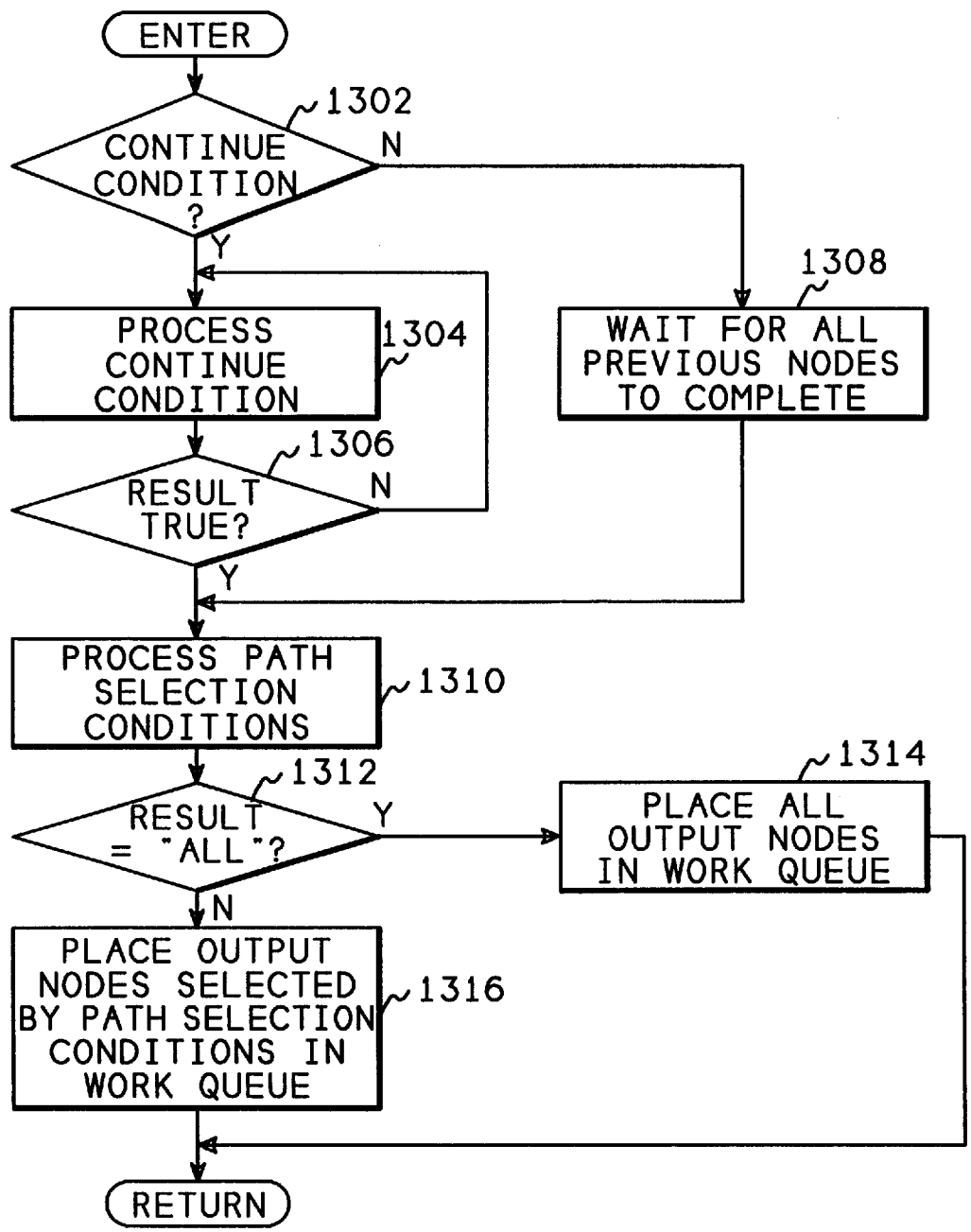
FIG. 13 shows a flowchart for the routing node process called from FIG. 10.

FIG. 13 shows a flowchart of the evaluate routing node process called from block 1016 of FIG. 10. Referring now to FIG. 13, after entry, block 1302 determines whether there are continue conditions, as would be defined, for example, in area 706 of FIG. 7. If there are no continue conditions, block 1302 transfers to block 1308 to wait for all previous nodes to complete before transferring to block 1310 to process path selection conditions.

If there are continue conditions, block 1302 transfers to block 1304 which processes the continue conditions. Block 1306 then determines whether the continue conditions have been met, and if not, transfers back to block 1304 to wait until the conditions are met.

If the continue conditions have been met, block 1306 transfers to block 1310 to process path selection conditions.

Block 1310 evaluates path selection conditions, and block 1312 determines whether the result of the path selection conditions is "ALL", as shown above with respect to area 712 of FIG. 7. "ALL" is also the default if no path selection conditions are present. If the result is that all output nodes should be activated, block 1312 transfers to block 1314 which places all nodes connected by arcs to the routing node into the work queue before returning to FIG. 10. If the result is not ALL, block 1312 transfers to block 1316 which places the output node(s) selected by the path selection conditions into the work queue and then returns to FIG. 10.

FIG. 14 shows a flowchart of the get agent process called by block 1204 of FIG. 12. This flowchart defines the organization service 206 of FIG. 2. Referring now to FIG. 14, after entry, block 1402 determines whether the organization service is synchronous or asynchronous.

Some organization services can provide a list of agents very quickly. This type of organization service is referred to as synchronous, since the result can be returned immediately. An organization service is asynchronous if it requires a longer time, involves communication with an external process, to resolve which agent should receive the task. When the organization service is asynchronous, it comprises two parts—the dispatcher that processes a request to determine the information required by the external organization service and to send that information to the external organization service, and an undispatcher which receives information from the external service and selects an agent from the information returned.

If the organization service is asynchronous, block 1402 transfers to block 1406 which dispatches a request to an external organization service process. Block 1408 then receives a reply from the external organization service process, which includes the agent and possibly other information. Block 1410 selects an agent from the reply information received in block 1408, and control then goes to block 1414 which returns the agent identification for the agent to the process of FIG. 12.

If the organization is synchronous, block 1402 transfers to block 1404 which determines whether the task was addressed to a specific agent within the procedure. If it was, block 1404 transfers to block 1414 which returns the agent ID of the agent to FIG. 12.

If the task was not addressed to a particular agent within the procedure, that is, is addressed to a group of agents, block 1404 transfers to block 1412 which selects an agent from the group and then transfers to block 1414 which returns the agent ID to the process of FIG. 12.

Alternatively, the task can be assigned to a group to allow ad-hoc processing of the task. This is useful, for example, when some aspects of the procedure cannot be well defined. The task can be assigned to a group, and anyone in the group is allowed to accept the task. Then the person accepting the task may perform some, all, or none of the work. If they desire, they can send the packet to another person in the group to perform some other work on the packet. In this manner, the workflow system can track the movement of the packet, which may help to define this portion of the procedure and allow the procedure definition to be updated in the future. After the work for the task is complete, anyone in the group can mark the task as done, and it is then sent on to the next node.

FIG. 15 shows a flowchart of the send task process called from block 1206 of FIG. 12. This flowchart also provides a detailed description of the transport service process 204 of FIG. 2.

Referring now to FIG. 15, after entry, block 1502 determines whether the transport service is tightly coupled or not.

Transport services can be of two types—tightly coupled services and loosely coupled services. If the transport service is tightly coupled, information is sent to the agent that is assigned to the task, which constitutes an offer to the agent. The agent must then accept the task before the task will actually be assigned to the agent. In a loosely coupled transport service, the acceptance is presumed and the task is simply assigned to the agent when the information packet is sent to the agent, with no way to determine whether the task is accepted.

If block 1502 determines that the transport service is tightly coupled, block 1502 transfers to block 1504 which offers the task to the agent and then block 1506 waits until the agent accepts the task. Control then goes to block 1508. If the agent does not accept the task, block 1506 transfers to block 1507 to raise an error condition, which must then be handled by the supervisor of the task.

If the transport service is loosely coupled, block 1502 transfers directly to block 1508.

Block 1508 then copies the information packet to the agent, allowing the agent to begin work on the task. Block 1510 waits until the task is completed before transferring to block 1512. Block 1512 determines if the task is tightly coupled, since no re-synchronization is needed when the task is tightly coupled, since the information does not get out of synchronization. Loosely coupled transport services are used when the representation of information held in the information service is made on an external system. The representation is modified by the task, rather that the actual information, thus, the information must be resynchronized. In a tightly coupled system the information is operated on directly by the agent performing the task, therefore, no resynchronization is needed.

If the process is not tightly coupled, block 1512 transfers to block 1514 to re-synchronize the information packet by copying the information that was created or modified by the agent. After re-synchronizing the packet, of if the task is tightly coupled, control goes to block 1516 which marks the task complete and returns to FIG. 12.

Figure 16:
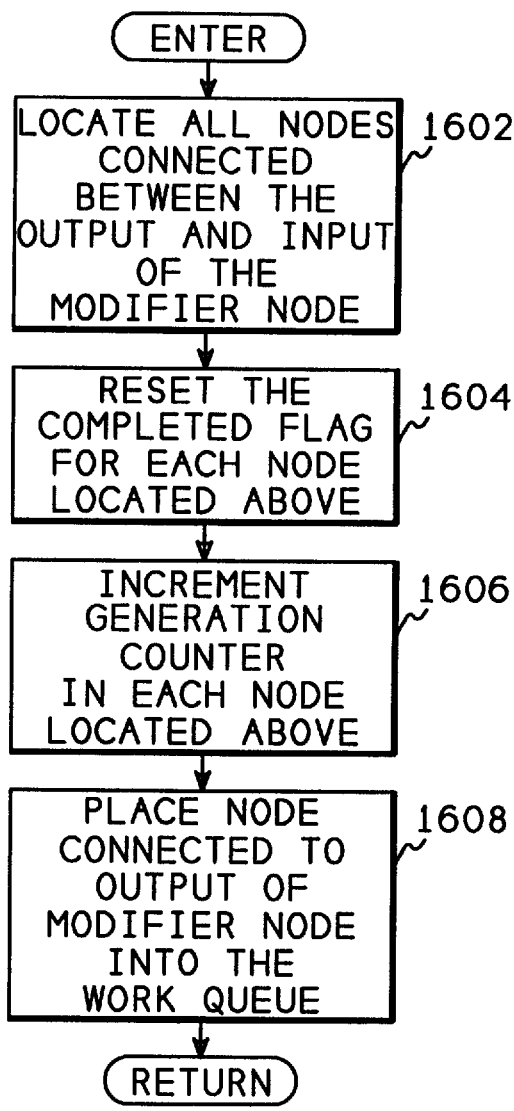
FIG. 16 shows the modifier node process called from FIG. 10.

FIG. 16 shows the modifier node process called from FIG. 10. Referring now to FIG. 16, after entry, block 1602 finds all nodes between the output and input of the modifier node. For example, modifier node 322 of FIG. 3 would find nodes 306, 308, 310, 312, 314, 316, and 318. Once the nodes are identified, block 1604 resets the completed flag for each of these nodes, and block 1606 increments the generation counter in each of the nodes. The generation counter allows the node to know that the work is being processed as second or subsequent time. This then allows the node to perform the work differently, if desired, on each pass through the node.

After resetting the flags and incrementing the generation counters, block 1608 places the node connected directly to the output of the modifier node into the work queue, for example, node 306 of FIG. 3. This starts the modification process, so block 1606 returns to FIG. 10.

An additional feature contained in the Distributed Workflow system is manual coordination override of an automatic process. This allows the owner of an instance of a process to suspend the processing of an instance, resume processing of the instance from the point where it was suspended, obsolete nodes that have been processed so that they may be processed again, and activate a suspended instance at any desired node.

The owner of an instance is responsible for the process flow and information of the instance. The owner is set when the instance is started, but may be changed as described above with respect to FIG. 4.

Figure 19:
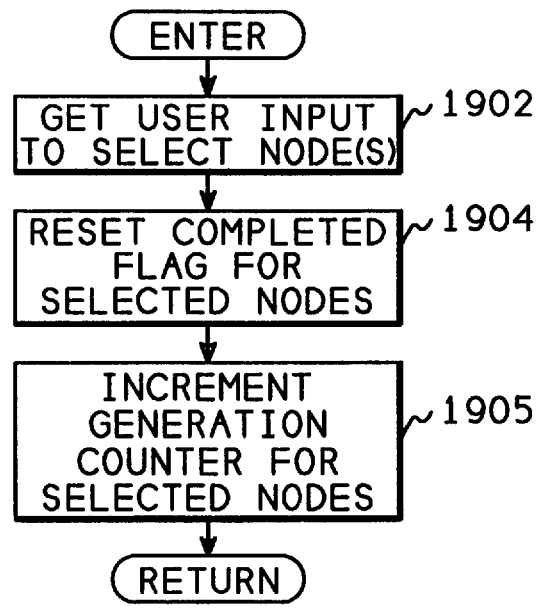
FIG. 19 shows a flowchart of the obsolete nodes process.
Figure 20:
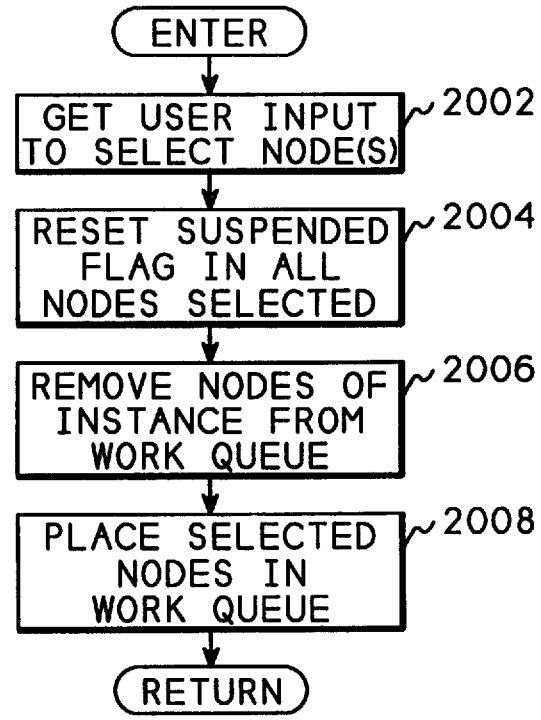
FIG. 20 shows a flowchart of the activate nodes process.

The manual coordination override is accomplished using a menu (not shown) with FIG. 3. This menu has options to SUSPEND, RESUME, OBSOLETE or ACTIVATE. When the SUSPEND menu option is selected, FIG. 17 is called by the workflow system; when the RESUME menu option is selected, FIG. 18 is called by the workflow system; when the OBSOLETE menu option is selected, FIG. 19 is called by the workflow system; and when the ACTIVATE menu option is selected, FIG. 20 is called by the workflow system.

Figure 17:
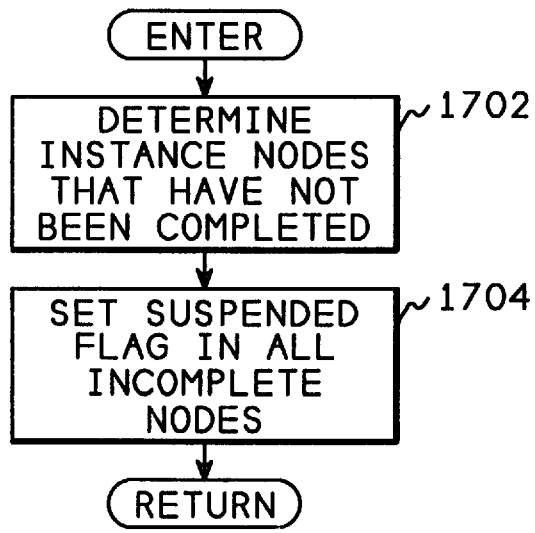
FIG. 17 shows a flowchart of the suspend instance process.

FIG. 17 shows a flowchart of the SUSPEND process called when a menu option is selected during processing of an instance. When the owner of an instance selects the SUSPEND process, the nodes that are being processed are allowed to continue until complete, however, no new nodes will be processed, since all nodes that have not been started will be marked as suspended. If a suspended node is selected for processing, the owner of the instance will be notified, as described above with respect to FIG. 10A. This same mechanism allows the instance owner to suspend a node of the procedure that has not yet been started. This instance is processed until that node is activated, at which point the owner is notified that the node has been reached. This allows the instance owner to set "breakpoints" in the instance and to inspect the instance before allowing the instance to progress.

Referring to FIG. 17, after entry, block 1702 determines the nodes of the instance that have not yet been completed. The instance is determined by the process being displayed in FIG. 3 when the menu option was selected. Block 1704 then sets a suspended flag in each of the nodes determined in block 1702 before returning.

Figure 18:
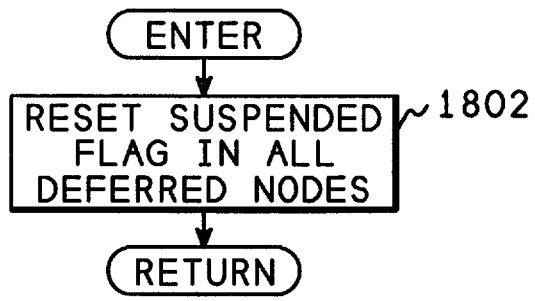
FIG. 18 shows a flowchart of the resume instance process.

FIG. 18 shows a flowchart of the RESUME process called when a menu option is selected during processing of an instance. The RESUME process allows a suspended instance to continue processing. Once RESUMEd, the coordinator will apply all the operations that were suspended while the instance was suspended, by placing the suspended nodes in the work queue.

Referring to FIG. 18, after entry, block 1802 resets the suspended flag in all suspended nodes for the instance. The instance is determined by the process being displayed in FIG. 3 when the menu option was selected.

FIG. 19 shows a flowchart of the OBSOLETE process called when a menu option is selected during processing of an instance. All nodes that have been completed can be obsoleted. When a node is obsoleted, the information about the node is changed so that the node can be re-executed.

Referring to FIG. 19, after entry, block 1902 gets user input to select the nodes that are to be obsoleted. Obsoleting a node causes its completion flag to be reset*, so that the node will be re-processed. Block 1904 then resets the completion flag for the nodes selected in block 1902.**

* and its generation counter to be incremented
 Block 1905 increments the generation counter for the nodes selected in block 1902**.

FIG. 20 shows a flowchart of the ACTIVATE process called when a menu option is selected during processing of an instance. Nodes that have not yet been processed or have been suspended can be activated. When a node is activated, its primary function will be performed:

Work nodes will be placed in the execution queue and processed.

Routing nodes will evaluate their routing decisions and transfer control to the nodes that follow them in the process.

Timeout nodes will start timing.

Event generator nodes will generate their events.

Event detector nodes will behave as if the event for which they are waiting had occurred.

Referring to FIG. 20, after entry, block 2002 gets user input to select the nodes to be activated. Block 2004 then resets the suspended flag in all nodes selected in block 2002, and block 2004 removes nodes of the instance from the work queue. Block 2008 then places the nodes selected in block 2002 into the work queue for processing.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A method for altering processing of a workflow method used for distributing and controlling work in a computer system, said work being defined by a workflow procedure having at least one node, said method for altering processing comprising the steps of:

(a) storing all workflow procedures in an information service;

(b) for each time a procedure is to be performed, retrieving said procedure from said information service into a coordination service and defining an instance for said procedure, said instance comprising said plurality of nodes with connections defined therebetween, wherein said connections define an order in which said nodes are processed, and an information packet comprising initial data for said instance;

(c) selecting a node of said instance to be performed;

(d) when said node selected in step (c) is marked as being suspended, continuing with step (g);

(e) performing work defined for said node selected in step (c);

(f) selecting a next node connected to said node processed in steps (d) through (e) and repeating steps (d) through (e) for said selected next node;

(g) repeating step (f) until all nodes of said procedure have been performed;

(h) when performing steps (c) through (f), accepting input of a single command from a user of said method, wherein said single command causes said method to suspend processing of said instance by marking all of said nodes within said instance, that have not started processing, as suspended; and (i) when performing steps (c) through (f), accepting input from a user of said method to resume processing of said instance by removing said suspended marking all of said nodes within said instance that are marked as suspended.

2. The method of claim 1 further comprising the step of:

(j) when performing steps (c) through (f), accepting input from a user of said method to re-process any nodes of said instance that have already been processed.

3. The method of claim 1 further comprising the step of:

(k) when performing steps (c) through (f), accepting input from a user of said method to activate processing of said instance by selecting at least one node for processing and removing marking all said selected nodes within said instance that are marked as deferred.

4. The method of claim 1 wherein said at least one node comprises one of a plurality of types of nodes comprising:

a work node defining an activity to be performed;

a routing node for determining a subsequent node to be performed;

a modifier node for determining which nodes to be performed again after an error is detected;

a timer node for informing said coordination service system after a predetermined amount of time;

a generator node for sending information to another workflow procedure; and a detector node for receiving information from another workflow procedure.

5. A method for altering processing of a workflow method used for distributing and controlling work in a computer system, said work being defined by a workflow procedure having at least one node, said method for altering processing comprising the steps of:

(a) storing all workflow procedures in an information service;

(b) for each time a procedure is to be performed, retrieving said procedure from said information service into a coordination service and defining an instance for said procedure, said instance comprising said plurality of nodes with connections defined therebetween, wherein said connections define an order in which said nodes are processed, and an information packet comprising initial data for said instance;

(c) selecting a node of said instance to be performed;

(d) when said node selected in step (c) is marked as being deferred, continuing with step (g);

(e) creating a task for said node;

(f) identifying an agent for performing said task through an organization service, sending said information packet in said instance to said agent through a transport service, and receiving results from said agent, whereby said agent performs all activities of said task;

(g) selecting a next node connected to said node processed in steps (d) through (f) and repeating steps (d) through (f) for said selected next node;

(h) repeating step (g) until all nodes of said procedure have been performed;

(i) when performing steps (c) through (g), accepting input of a single command from a user of said method, wherein said single command causes said method to suspend processing of said instance by marking all of said nodes within said instance, that have not started processing, as deferred; and (j) when performing steps (c) through (g), accepting input from a user of said method to resume processing of said instance by removing marking all of said nodes within said instance that are marked as deferred.

6. The method of claim 5 further comprising the step of:

(k) when performing steps (c) through (g), accepting input from a user of said method to re-process any nodes of said instance that have already been processed.

7. The method of claim 5 further comprising the step of:

(l) when performing steps (c) through (g), accepting input from a user of said method to activate processing of said instance by selecting at least one node for processing and removing marking all said selected nodes within said instance that are marked as deferred.

8. The method of claim 5 wherein said at least one node comprises one of a plurality of types of nodes comprising:

a work node defining an activity to be performed;

a routing node for determining a subsequent node to be performed;

a modifier node for determining which nodes to be performed again after an error is detected;

a timer node for informing said coordination service system after a predetermined amount of time;

a generator node for sending information to another workflow procedure; and a detector node for receiving information from another workflow procedure.

9. A method for altering processing of a workflow method used for distributing and controlling work in a computer system, said work being defined by a workflow procedure having at least one node, said method for altering processing comprising the steps of:

(a) storing all workflow procedures in an information service;

(b) for each time a procedure is to be performed, retrieving said procedure from said information service into a coordination service and defining an instance for said procedure, said instance comprising said plurality of nodes with connections defined therebetween, wherein said connections define an order in which said nodes are processed, and an information packet comprising initial data for said instance;

(c) selecting a node of said instance to be performed;

(d) when said node selected in step (c) is marked as being deferred, continuing with step (g);

(e) performing work defined for said node selected in step (c);

(f) selecting a next node connected to said node processed in steps (d) through (e) and repeating steps (d) through (e) for said selected next node;

(g) repeating step (f) until all nodes of said procedure have been performed;

(h) when performing steps (c) through (f), accepting input of a single command from a user of said method, wherein said single command causes said method to suspend processing of said instance by marking all of said nodes within said instance, that have not started processing, as deferred;

(i) when performing steps (c) through (f), accepting input from a user of said method to resume processing of said instance by removing marking all of said nodes within said instance that are marked as deferred;

(j) when performing steps (c) through (f), accepting input from a user of said method to re-process any nodes of said instance that have already been processed; and (k) when performing steps (c) through (f), accepting input from a user of said method to activate processing of said instance by selecting at least one node for processing and removing marking all said selected nodes within said instance that are marked as deferred.

\* \* \* \* \*